(12) United States Patent
Guidetti et al.

(10) Patent No.: US 12,461,145 B1
(45) Date of Patent: Nov. 4, 2025

(54) TEMPORAL LOCKSTEP

(71) Applicants: STMicroelectronics International N.V., Geneva (CH); ALMA MATER STUDIORUM—UNIVERSITA' DI BOLOGNA, Bologna (IT)

(72) Inventors: Elio Guidetti, Montano Lucino (IT); Filippo Grillotti, Milan (IT); Fabio Giuseppe De Ambroggi, Biassono (IT); Riccardo Tedeschi, Reggio nell'Emilia (IT); Davide Rossi, Bologna (IT); Alessandro Nadalini, Crevalcore (IT)

(73) Assignees: STMicroelectronics International N.V., Geneva (CH); ALMA MATER STUDIORUM—UNIVERSITA' DI BOLOGNA, Bologna (IT)

( * ) Notice: Subject to any disclaimer, the term of this patent is extended or adjusted under 35 U.S.C. 154(b) by 0 days.

(21) Appl. No.: 18/652,398

(22) Filed: May 1, 2024

(51) Int. Cl.
*G01R 31/317* (2006.01)
*G06F 9/30* (2018.01)
*G06F 9/38* (2018.01)

(52) U.S. Cl.
CPC ... *G01R 31/31715* (2013.01); *G06F 9/30181* (2013.01); *G06F 9/3802* (2013.01)

(58) Field of Classification Search
None
See application file for complete search history.

(56) References Cited

U.S. PATENT DOCUMENTS

| | | | | |
|---|---|---|---|---|
| 5,317,726 | A * | 5/1994 | Horst | G06F 11/0724 714/37 |
| 2009/0044086 | A1* | 2/2009 | Craske | G06F 11/1064 714/799 |
| 2013/0036336 | A1* | 2/2013 | Kitamura | H04L 47/562 714/E11.178 |
| 2014/0304573 | A1* | 10/2014 | Dodson | G06F 11/0751 714/807 |
| 2020/0089559 | A1 | 3/2020 | Ainsworth et al. | |
| 2020/0192742 | A1 | 6/2020 | Boettcher et al. | |
| 2021/0173738 | A1 | 6/2021 | Vijayaraghavan et al. | |

(Continued)

OTHER PUBLICATIONS

S. Almukhaizim, P. Petrov and A. Orailoglu, "Faults in processor control subsystems: testing correctness and performance faults in the data prefetching unit," Proceedings 10th Asian Test Symposium, Kyoto, Japan, 2001, pp. 319-324, (Year: 2001).*

*Primary Examiner* — Daniel F. McMahon
(74) *Attorney, Agent, or Firm* — Alston & Bird LLP

(57) ABSTRACT

Apparatuses, systems, and methods for implementing temporal lockstep for error detection utilizing a single processor core are provided. For example, a processor core includes a pipeline with an instruction fetch circuit and an instruction decode and execute circuit. The instruction decode and execute circuit comprises a controller including a finite state machine with a plurality of states to control the processor core. A voting circuit is provided to vote on a control signal to control the finite state machine for transitioning from a current state to a next state. The processor core, based at least on the plurality of states of the finite state machine, is configured to: execute the first dummy instruction to generate a first dummy result; store the first dummy result in a first dummy buffer; execute the first real instruction to generate a first real result; compare the results to identify an error.

20 Claims, 13 Drawing Sheets

(56) References Cited

U.S. PATENT DOCUMENTS

2022/0067155 A1   3/2022   Favor et al.
2022/0100601 A1*  3/2022   Baum ................. G06F 11/1004
2022/0206875 A1   6/2022   Shanbhogue et al.

* cited by examiner

TEMPORAL LOCKSTEP

TECHNOLOGICAL FIELD

Example embodiments of the present disclosure relate generally to computer processors and data processing, and more particularly to apparatuses, systems, and methods for implementing temporal lockstep for error detection utilizing a single processor core.

BACKGROUND

Computer processors (e.g., microprocessors) fetch, decode, and execute instructions to perform programs. A computer processor, however, may experience faults during performing these operations. Faults may include soft faults (i.e., transient faults) and hard faults (i.e., permanent faults). Soft errors are non-destructive and may be recovered from. Hard errors are destructive.

The detectability and/or recoverability of one or more errors in computation are conventionally achieved with redundant processors or processor cores that perform computations in parallel to check when computations are performed correctly or incorrectly through matching the output of each processor or processor core. Such parallel computations may be referred to as lockstep or lockstep processing, which refers to an additional computation core (e.g., a lockstep core) which is supposed to produce the same result as a first computation code. A mismatch in output of these parallel computations detects an error.

The use of additional computation core(s) has multiple short comings. For example, the additional processors or processor cores not only increase costs but also increase the required area, supporting infrastructure, additional power, and additional software that may be required to compare the computation results to identify an error.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein related to improved error detection and recovery, particularly in a single core of a processor core that uses temporal lockstep for identifying errors.

In accordance with some embodiments of the present disclosure, an example apparatus is provided. The apparatus comprising: a processor core comprising a pipeline including an instruction fetch circuit and an instruction decode and execute circuit; wherein the instruction decode and execute circuit comprises a controller including a finite state machine, wherein the finite state machine comprises a plurality of states to control the processor core; a voting circuit configured to provide a control signal to control the finite state machine for transitioning from a current state of the plurality of states to a next state; wherein the processor core, based at least on the plurality of states of the finite state machine, is configured to: fetch a first instruction from the instruction memory; generate a first dummy instruction based on the first instruction and a first real instruction based on the first instruction; execute the first dummy instruction to generate a first dummy result; store the first dummy result in a first dummy buffer; execute the first real instruction to generate a first real result; compare the first dummy result stored in the first dummy buffer with the first real result to identify an error.

In accordance with some embodiments of the present disclosure, an example system is provided. The system may comprise: an instruction memory; a processor core comprising a pipeline including an instruction fetch circuit and an instruction decode and execute circuit; wherein the instruction decode and execute circuit comprises a controller including a finite state machine, wherein the finite state machine comprises a plurality of states to control the processor core; a voting circuit configured to provide a control signal to control the finite state machine for transitioning from a current state of the plurality of states to a next state; wherein the processor core, based at least on the plurality of states of the finite state machine, is configured to: fetch a first instruction from the instruction memory; generate a first dummy instruction based on the first instruction and a first real instruction based on the first instruction; execute the first dummy instruction to generate a first dummy result; store the first dummy result in a first dummy buffer; execute the first real instruction to generate a first real result; compare the first dummy result stored in the first dummy buffer with the first real result to identify an error.

In accordance with some embodiments of the present disclosure, an example method is provided. The method may comprise: providing a processor core comprising a pipeline including an instruction fetch circuit and an instruction decode and execute circuit; wherein the instruction decode and execute circuit comprises a controller including a finite state machine, wherein the finite state machine comprises a plurality of states to control the processor core; providing a voting circuit configured to provide a control signal to control the finite state machine for transitioning from a current state of the plurality of states to a next state; fetching, with the instruction fetch circuit, a first instruction; generating a first dummy instruction based on the first instruction and a first real instruction based on the first instruction; executing, with the instruction decode and execute circuit, a first dummy instruction to generate a first dummy result; store the first dummy result in a first dummy buffer; executing, with the instruction decode and execute circuit, the first real instruction to generate a first real result; and comparing the first dummy result stored in the first dummy buffer with the first real result to identify an error.

In some embodiments, the voting circuit comprises a plurality of combinational logic circuits and a plurality of FIFO circuits, wherein each of the FIFO circuits is uniquely associated with one of the plurality combinational logic circuits, and wherein the voting circuitry is electrically connected to receive inputs from the plurality of FIFO circuits and the plurality of combinational logic circuits and determine an output based at least on a majority of common inputs from the plurality of FIFO circuits and the plurality of combinational logic circuits having the same outputs.

In some embodiments, the pipeline further includes a pipeline checker circuit between the instruction fetch circuit and the instruction decode and execute circuit, wherein the pipeline checker circuit is configured to identify a pipeline error associated with one or more instructions provided from the instruction fetch circuit to the instruction decode and execute circuit.

In some embodiments, the includes a register file checker circuit configured to identify an error associated with a register file of the processor core.

In some embodiments, a recovery circuit configured to, on identifying an error, trigger one or more recovery operations to repeat execution of one or more operations by the processor core.

In some embodiments, the processor core is further configured to: execute the first dummy instruction to generate a first dummy value at a first clock cycle; and execute the first real instruction to generate a first real value at a second clock cycle.

In some embodiments, the second clock cycle is adjacent to the first clock cycle.

In some embodiments, the second clock cycle is not adjacent to the first clock cycle.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
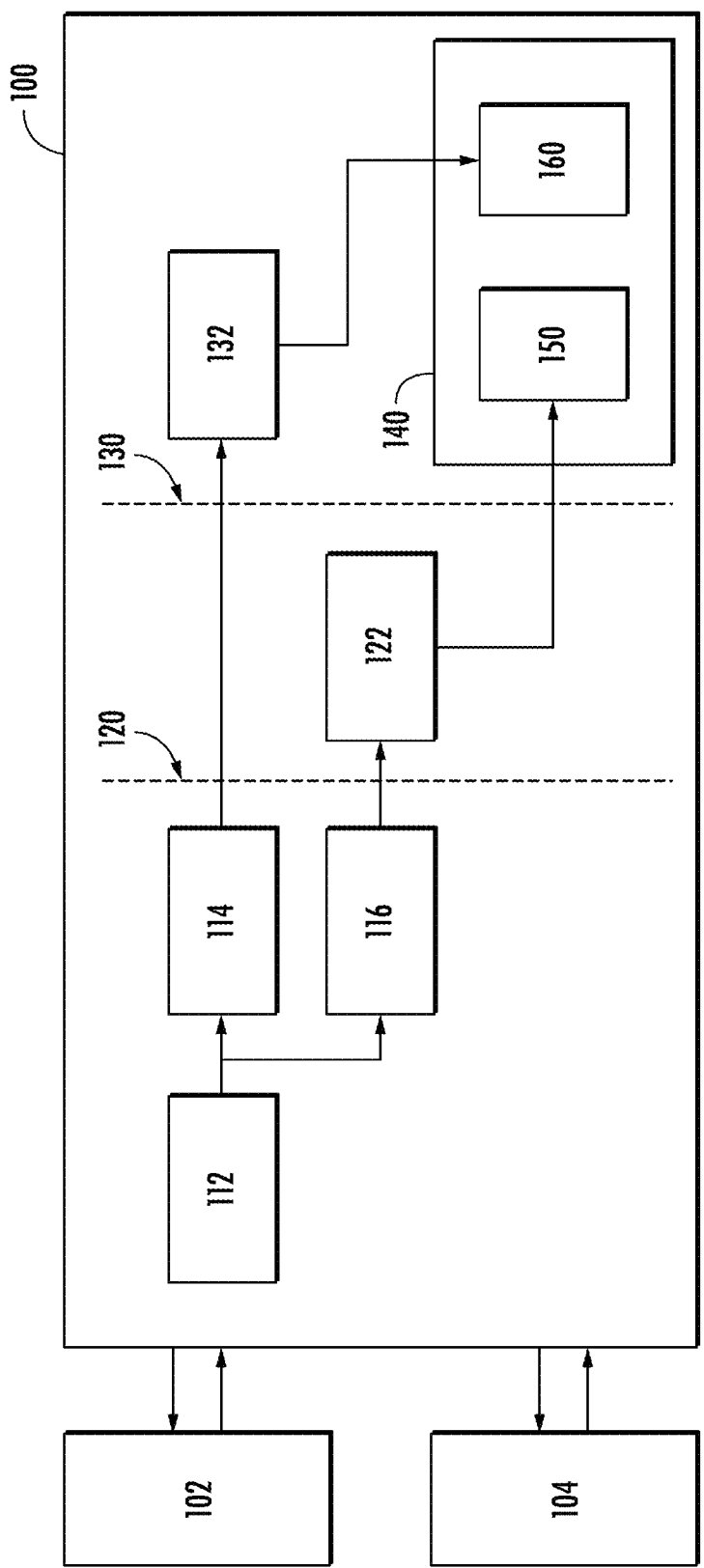
Figure 2:
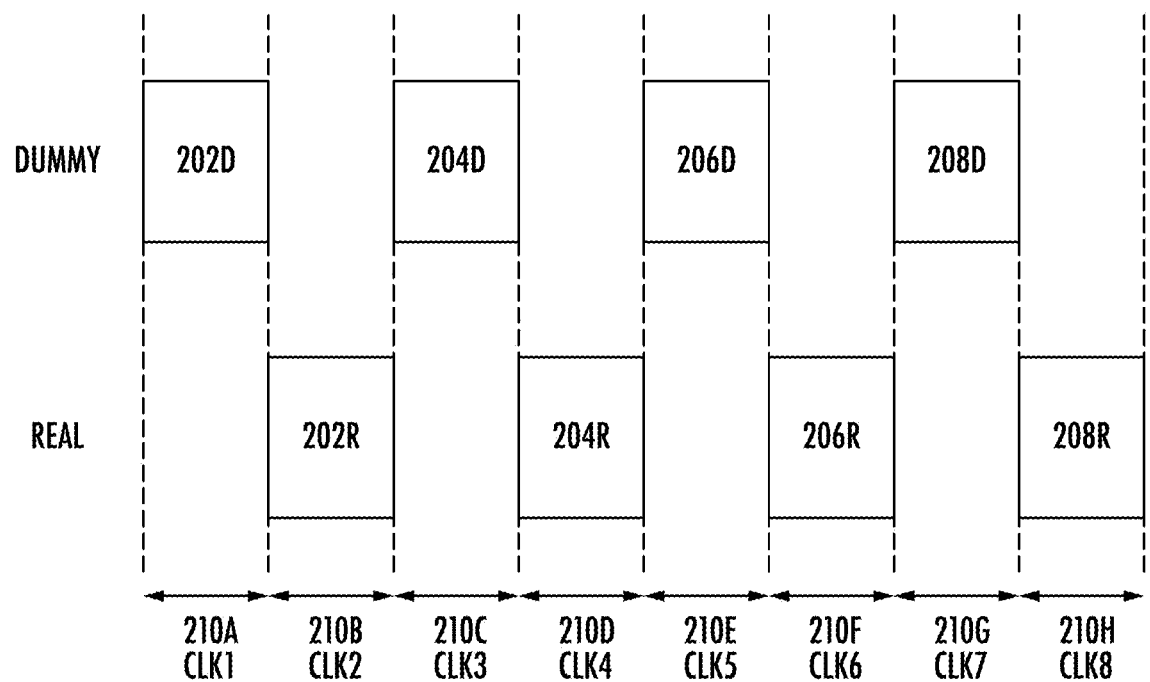
Figure 3:
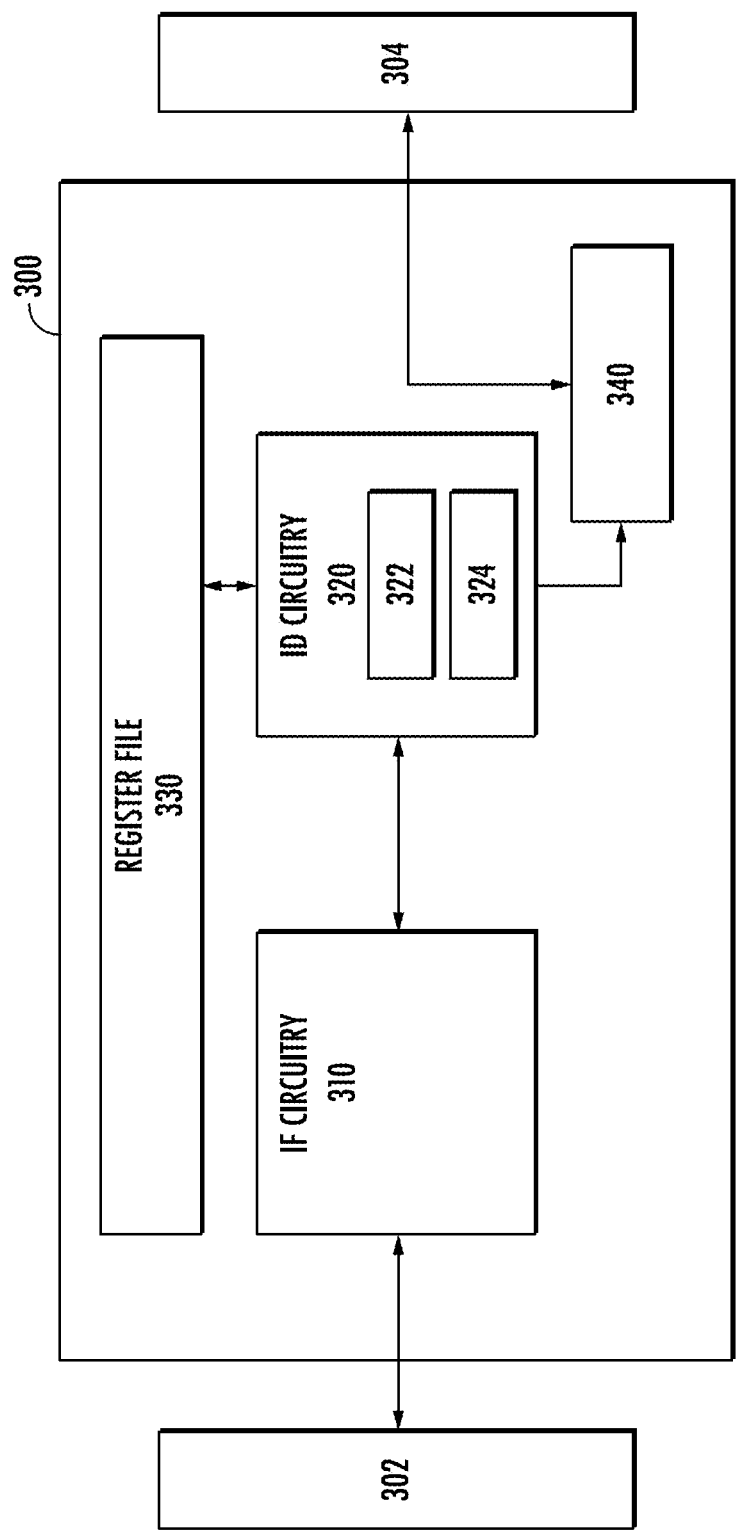
Figure 4:
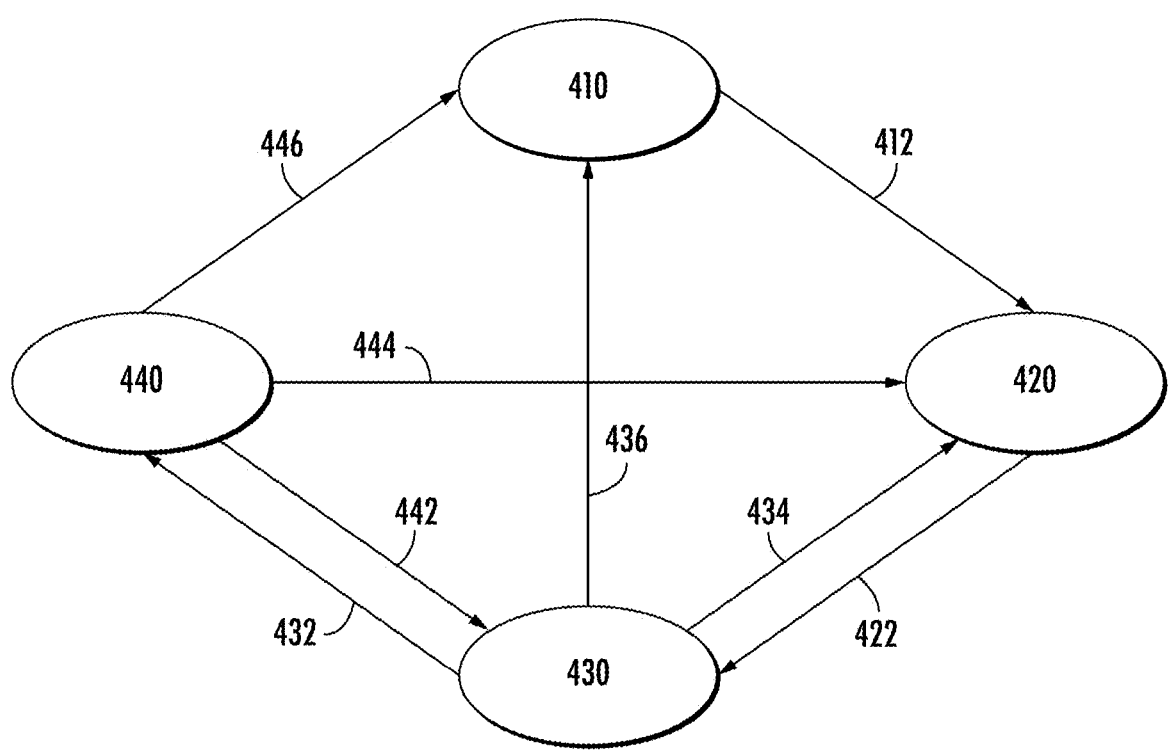
Figure 5:
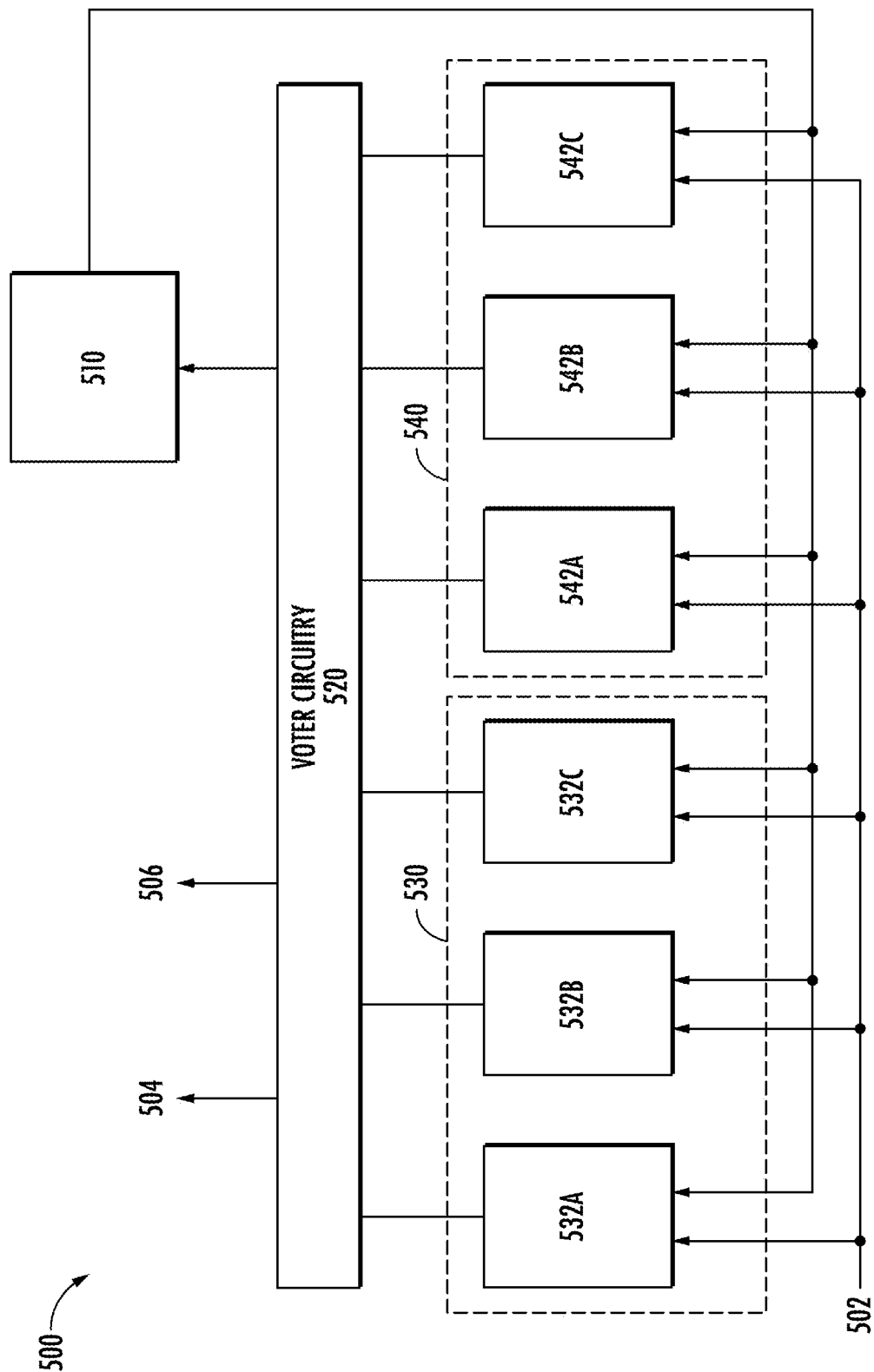
Figure 6:
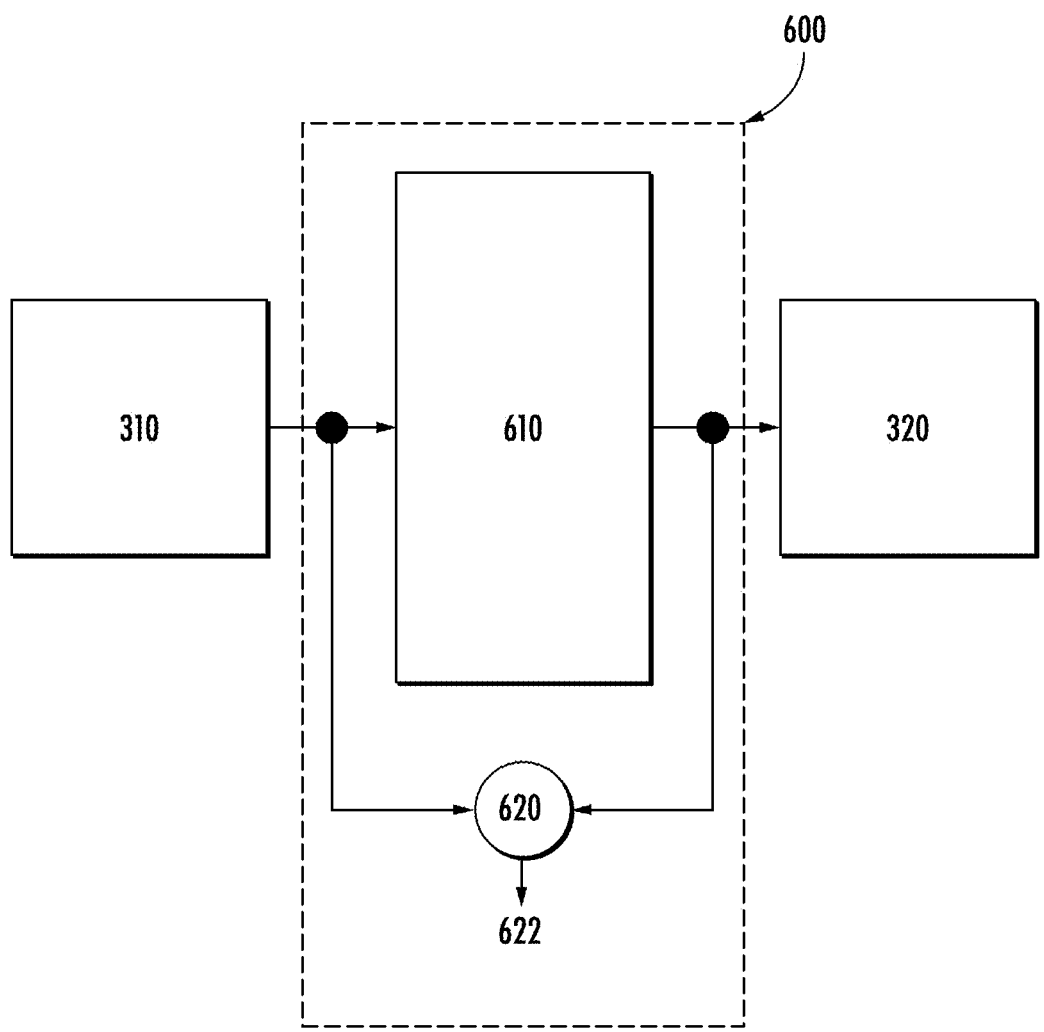
Figure 7:
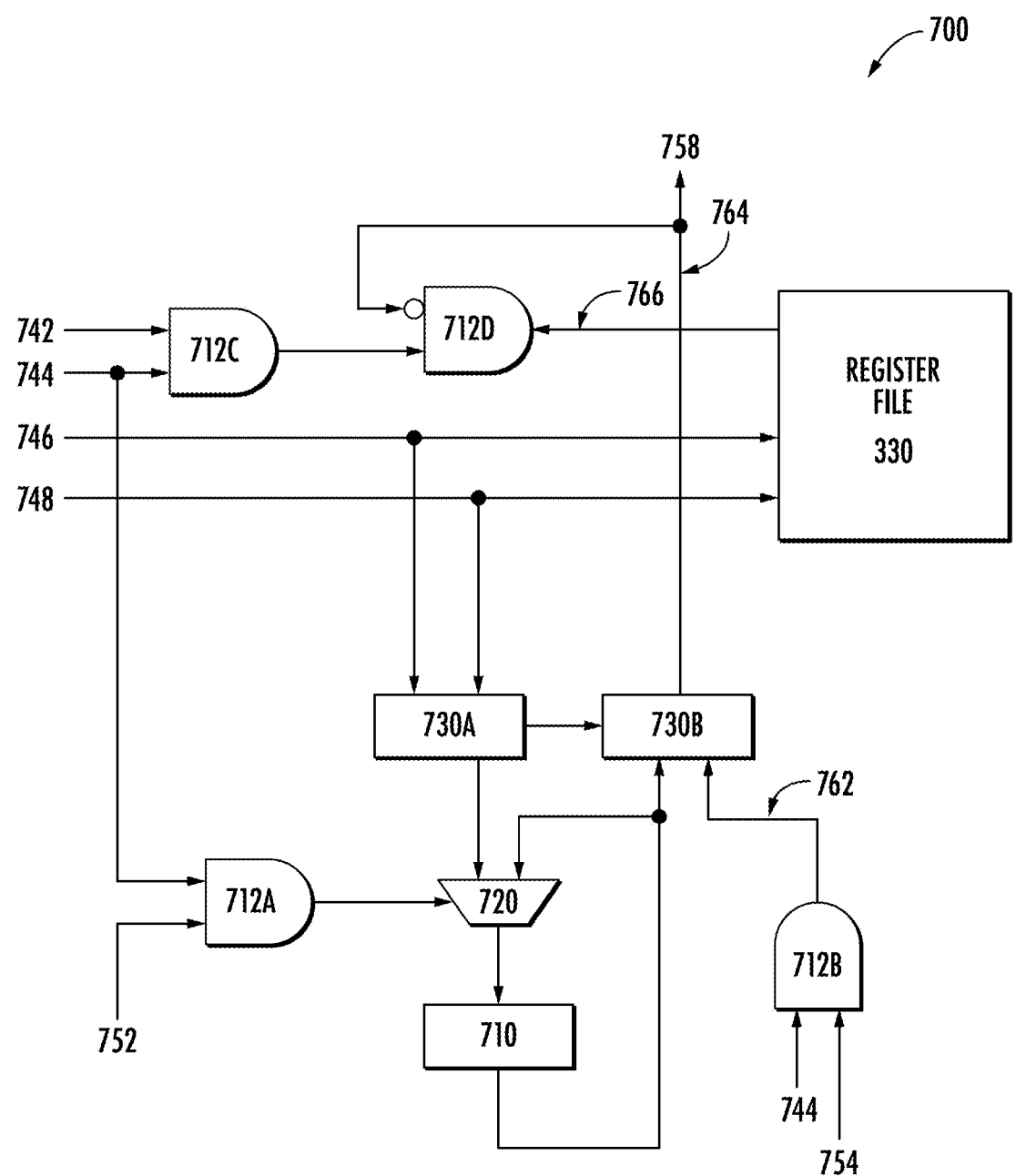
Figure 8:
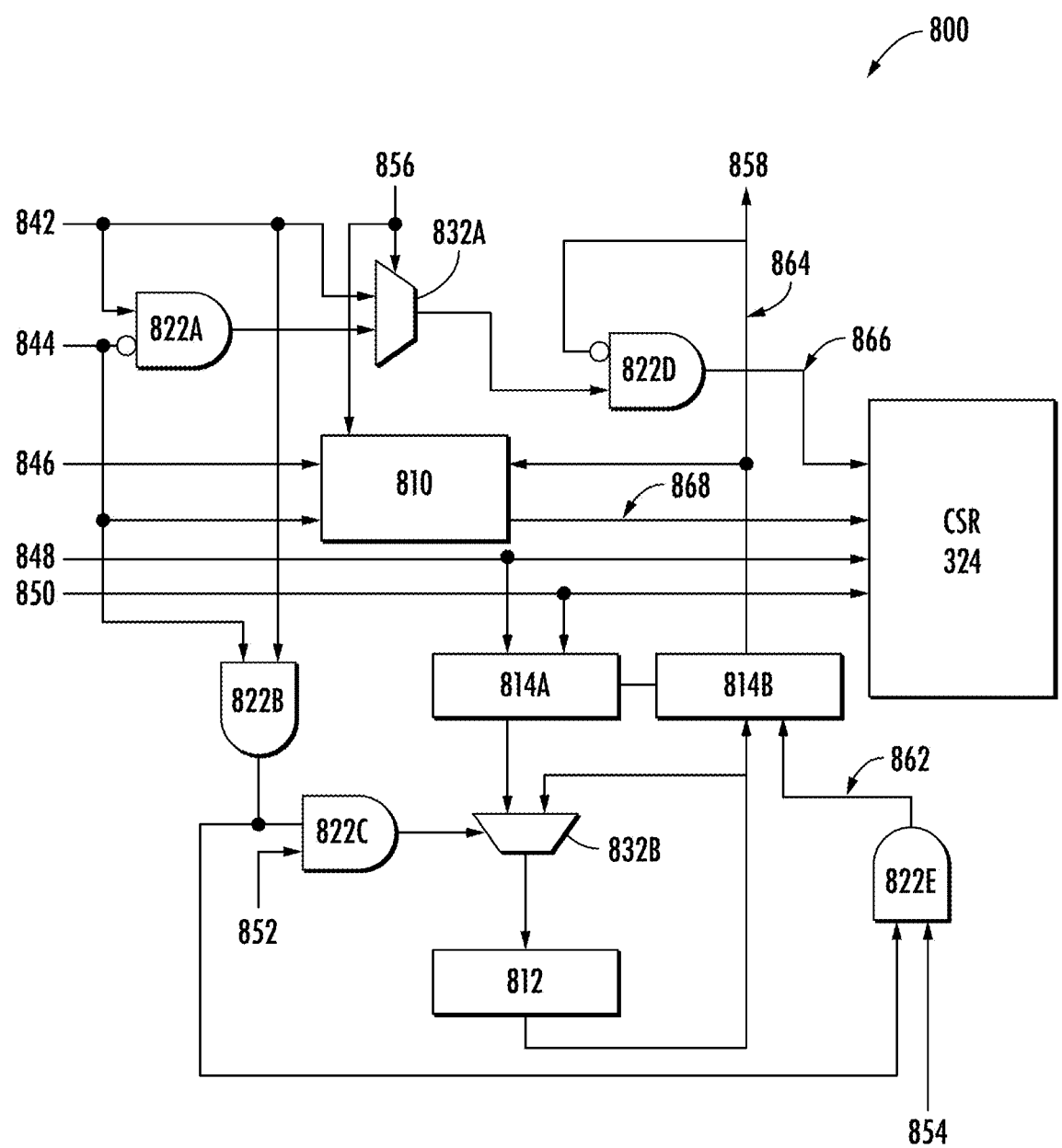
Figure 9:
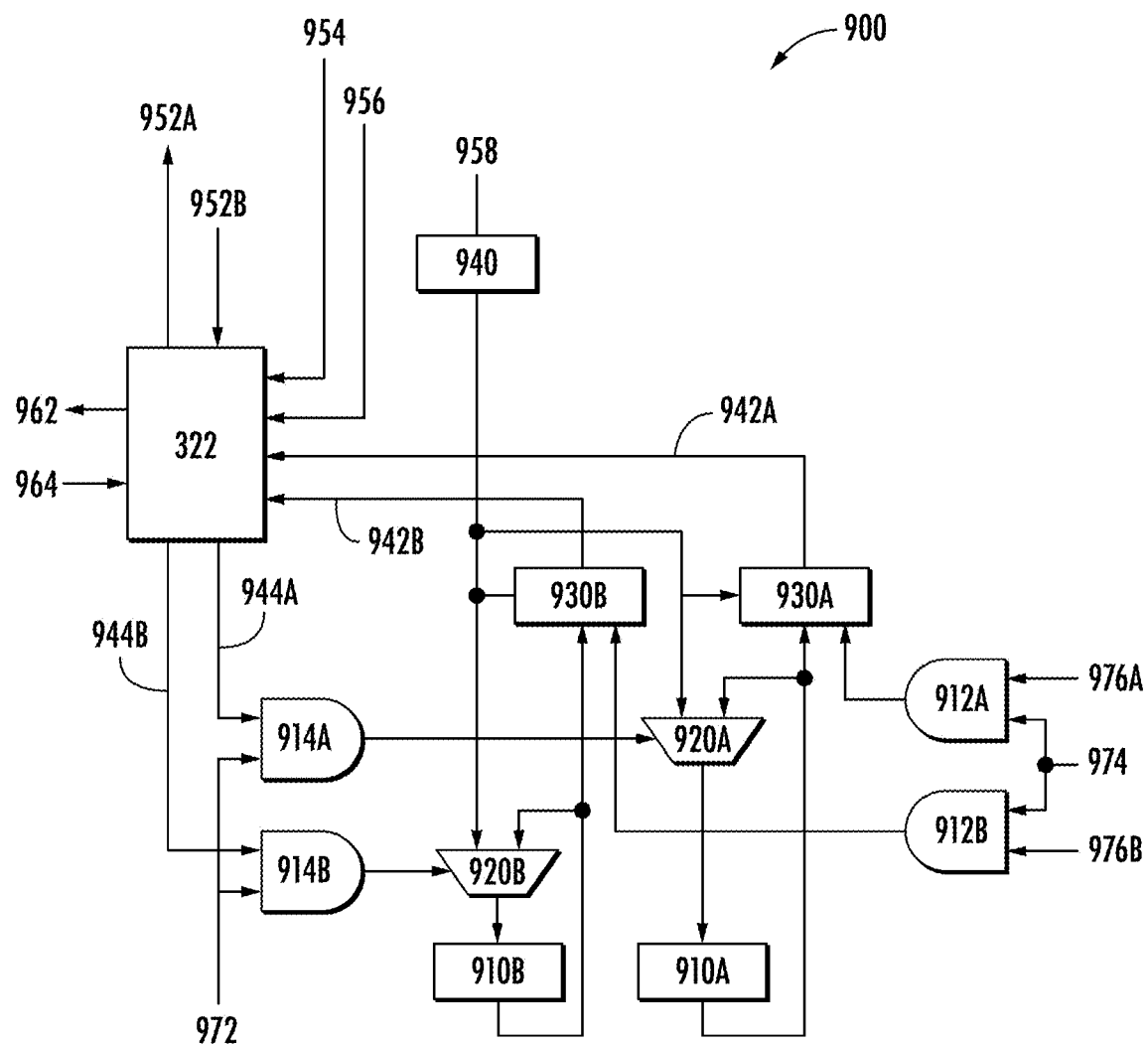
Figure 10:
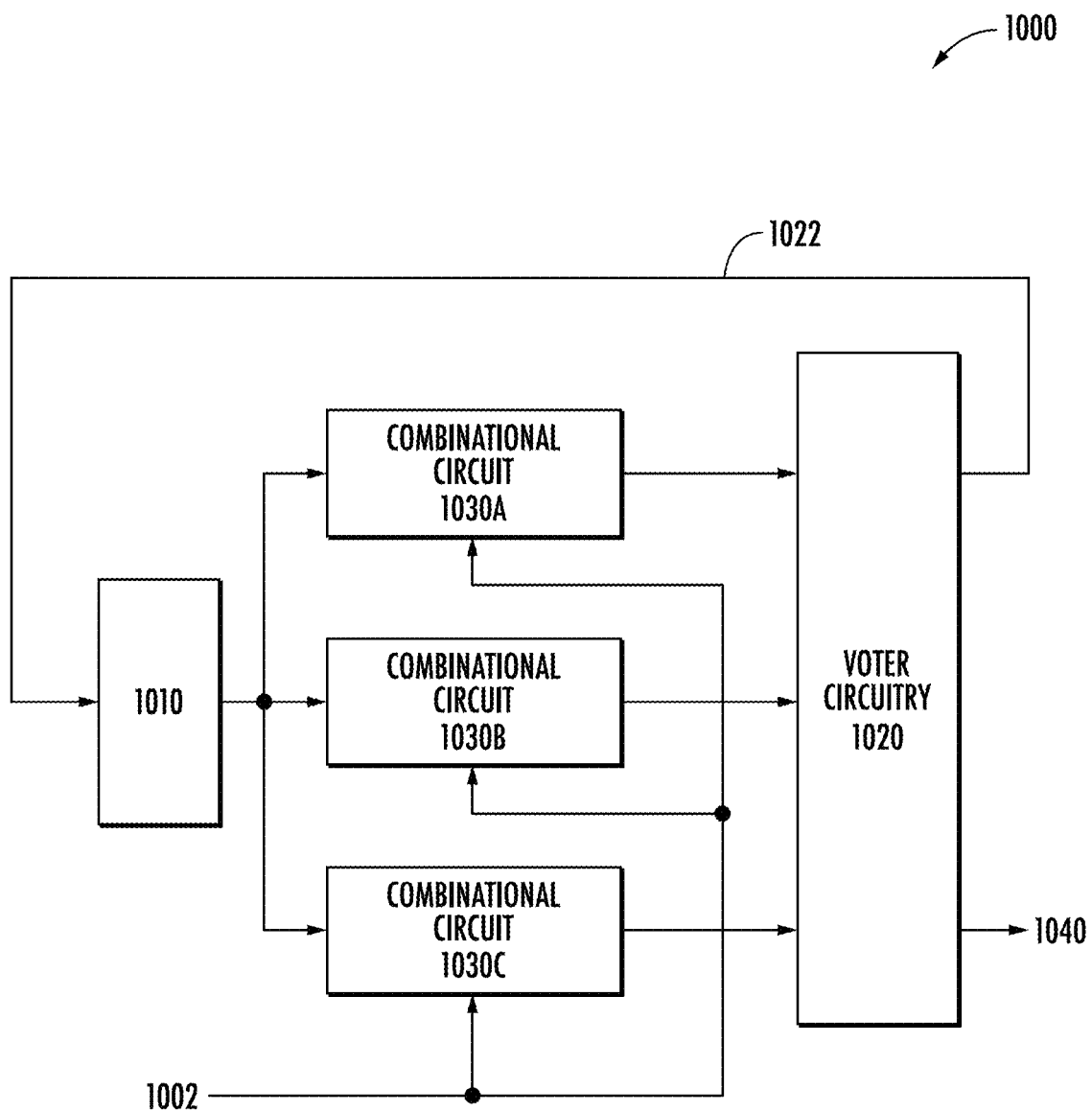
Figure 11A:
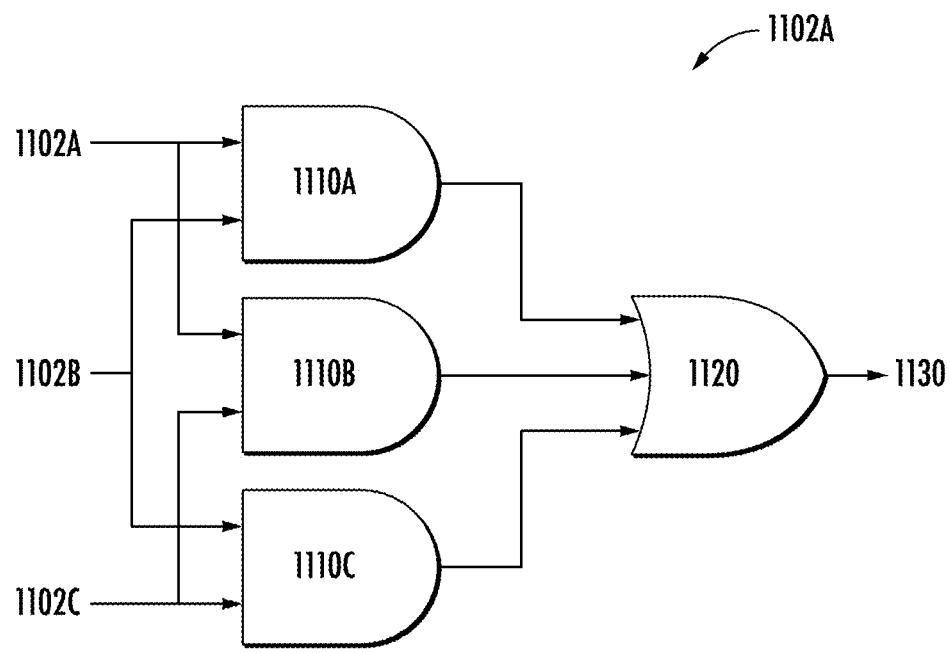
Figure 11B:
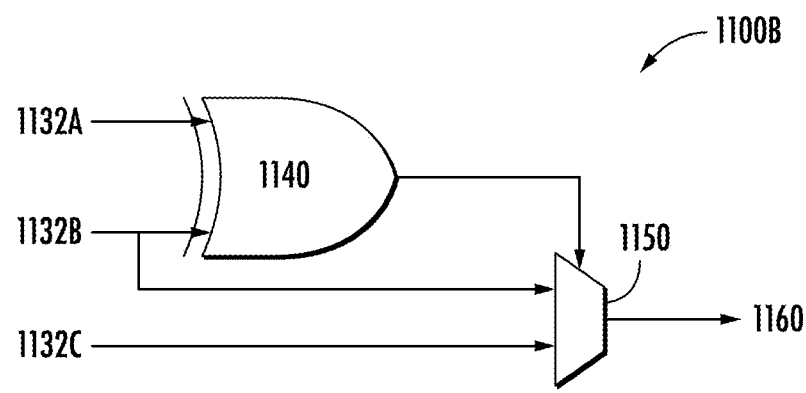
Figure 12:
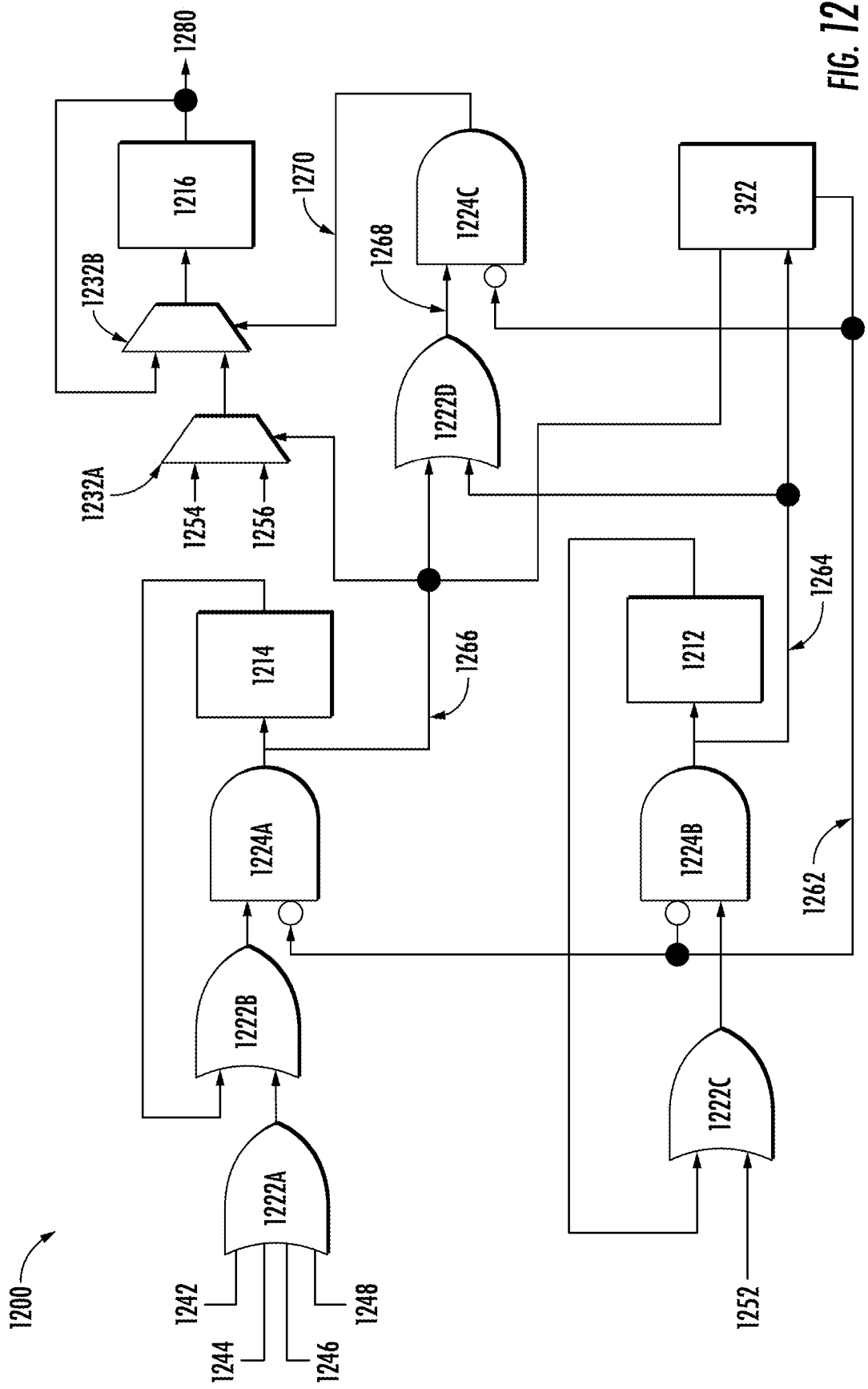
Figure 13:
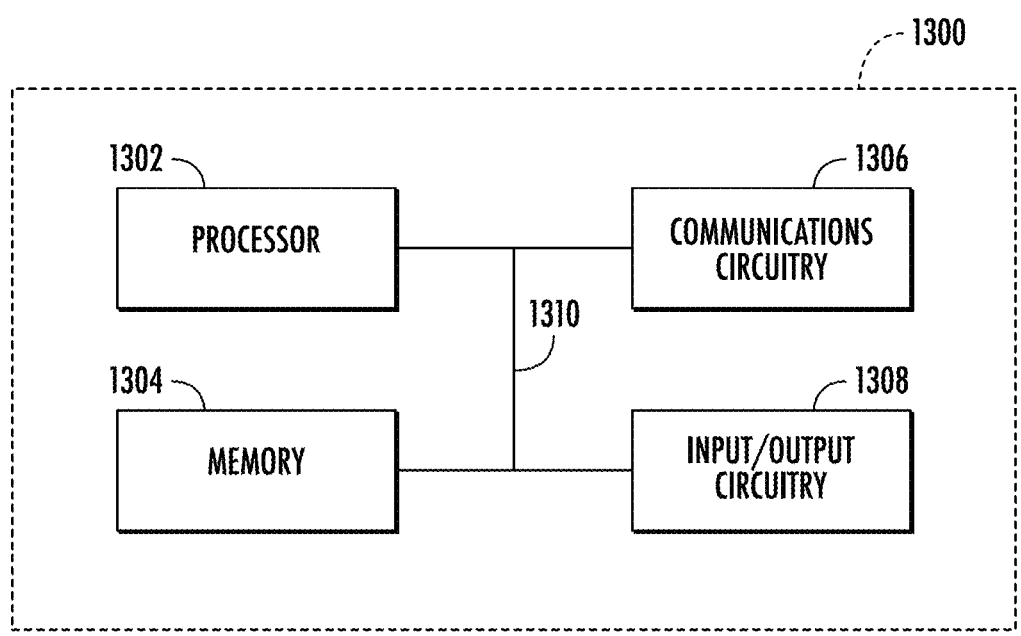

Having thus described certain example embodiments of the present disclosure in general terms, reference will now be made to the accompanying drawings, which are not necessarily drawn to scale, and wherein:

FIG. 1 illustrates an exemplary diagram of a temporal lockstep logic with a single core in accordance with one or more embodiments of the present disclosure;

FIG. 2 illustrates an exemplary sequence diagram of a time repetition operations in accordance with one or more embodiments of the present disclosure;

FIG. 3 illustrates an exemplary block diagram of a single core in accordance with one or more embodiments of the present disclosure;

FIG. 4 illustrates an exemplary diagram of a time repetition control logic in accordance with one or more embodiments of the present disclosure;

FIG. 5 illustrates an exemplary diagram of an instruction duplication logic in accordance with one or more embodiments of the present disclosure;

FIG. 6 illustrates an exemplary diagram of a data path protection logic for a pipeline in accordance with one or more embodiments of the present disclosure;

FIG. 7 illustrates an exemplary diagram of a data path protection logic for a register file in accordance with one or more embodiments of the present disclosure;

FIG. 8 illustrates an exemplary diagram of data path protection logic for a CSR in accordance with one or more embodiments of the present disclosure;

FIG. 9 illustrates an exemplary diagram of data path protection logic for an LSU in accordance with one or more embodiments of the present disclosure;

FIG. 10 illustrates an exemplary diagram of control check logic in accordance with one or more embodiments of the present disclosure;

FIGS. 11A and 11B illustrate exemplary diagrams of voting circuits in accordance with one or more embodiments of the present disclosure;

FIG. 12 illustrates an exemplary diagram of recovery logic in accordance with one or more embodiments of the present disclosure; and FIG. 13 illustrates an exemplary block diagram of a device in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuit" or "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

Overview

Applications are increasingly requiring error detection and recovery. For example, functional safety technical applications may require solutions that individuate an error and recover from the error when possible. For example, automotive, aerospace, and consumer electronics may require higher degrees of reliability, which includes detecting errors or malfunctions. Additionally, applications may also require recovery from such errors or malfunctions. In certain applications there may be standards that address reliability, such as in functional safety technical fields. In an automotive application this may be, for example, ISO 26262. Such standards may provide how an application may perform in detecting and recovering from errors, such as from soft errors. Soft errors are nondestructive errors or faults that may be fixed after a recovery or reset is performed. In contrast, a hard error may be a destructive errors from which a reset does not allow for fixing.

Various embodiments of the present disclosure are directed to improved error detection and recovery, particularly in a single core of a processor core that uses temporal lockstep for identifying errors. Additionally, various embodiments of the present disclosure, such as circuits described herein, use only hardware, which improves, among other things, the speed of error detection and recovery.

A processor core may be a single computational unit. In various embodiments, a processor may have one processor core. Alternatively, a processor may have multiple processor cores and operations described herein may be performed on one of these multiple processor cores.

In the present disclosure, a single processor core or single core may perform what otherwise would conventionally be done with two or more duplicative processor cores. As described further herein, various embodiments utilize a single processor core to perform the same computation more than once and then compare the results of these computations to identify if an error has occurred. The present disclosure performs these two or more computations of the same operation at different times, such as one after another in adjacent clock cycles. Thus there is a temporal lockstep performed by one processor or one processor core. In various embodiments, when an error is identified, then one or more recovery operations associated with the error(s) identified may be performed to recover from the error.

For example, various embodiments of the present disclosure execute an instruction twice to compute the output of the instruction twice and compare the outputs. The two executions of the same instruction occur at, respectively, a first time period and a second time period. This might be a first clock cycle and a second clock cycle. Time is used as a redundancy for execution of instructions. Additionally, various embodiments include space redundancy for control blocks and signals, such as by comparing and voting on signal and control operations. In various embodiments an error detected is corrected by one or more recovery operations, which may include repeating a previously executed instruction, such as in the clock cycles following identification of the error.

The performance of lockstep behavior is by executing the same instruction twice through controlling operations of the processor core with hardware. Various embodiments perform controlling operations of the processor core with a finite state machine in a controller of the single processor core. This finite state machine may progress through a plurality of states based on control signals or lack of control signals received by the controller. In various embodiments, a control signal may be one or more signals received by the finite state machine that control it to transition to a next state. For example, the states of the finite state machine control the fetching and execution of instructions. The processor core executes a dummy phase at a first time period and then a real phase in a second time period. While the real phase in the second time period is being executed the result of the dummy phase is stored in a dummy buffer. The result of the dummy phase execution and the result of the real phase execution are compared to identify an error in instruction execution. If there is no error, then the result of the real phase may be output by the processor core (e.g., written to a memory). Additionally, if no error occurs then the status of the core may change to proceed to a next status. Alternatively, if an error is identified, an error detection signal is generated and an instruction that generated the error may be executed again.

In addition to the lockstep behavior of the finite state machine, a voting structure is implemented with voting circuit(s) on control logic may be included to detect and recover from soft errors that may occur while transmitting control signals.

The present disclosure provides a hardware based system with multiple benefits, including but not limited to providing real-time error detection and recoverability. Use of hardware or circuitry may be used to lower processing time compared to certain operations being performed in software. For example, various embodiments may utilize circuitry and/or hardware to identify of one or more errors. This may identify an error faster to improved reaction time for taking one or more operations based on the identification of the error.

The present disclosure also allows for a cost effective fail-safe operation of a hardware based system. The present disclosure allows for implementations that use smaller physical area and reduced power. This allows for a smaller and more efficient microcontroller. Utilizing a hardware based system for error detection may increase the speed and/or reliability of error detection.

In contrast to conventional systems relying on software, the present disclosure is a hardware based system with lockstep behavior and voting structure providing for, among other things, improved responsiveness and reduced overhead. For example, while a software based system may require 3 clock cycles per instruction (CPI), which might be triplicate in overall size, the present disclosure may perform the equivalent operations less time, such as 2 CPI-one for executing a dummy instruction and one for executing a real instruction. Further, and in contrast to conventional system relying on multiple cores to perform lockstep behavior (e.g., a first core for executing instructions and a second checker core), the present disclosure avoids the extra core(s) for checking operations.

Exemplary Apparatuses, Systems, and Methods

FIG. 1 illustrates an exemplary diagram of a temporal lockstep logic with a single core in accordance with one or more embodiments of the present disclosure. A core 100 may be a single processor core or main core of a multicore processor. The core 100 may communicate with memory or memories, such as an instruction memory 102 and/or a data memory 104. The instruction memory 102 may store one or more instructions for execution by the core 100, such as for performing a computations or operation. The data memory 104 may store data associated with a computation or operations. In various embodiments the core 100 may perform one or more operations to fetch an instruction from an instruction memory 102 and/or write output(s) to a data memory 104.

The core 100 may be controlled by a controller to execute one or more operations, including iterating or repeating an operation.

For example, an instruction 112 fetched from the instruction memory 102 may be received by the core 100. The instruction 112 may be split or duplicated into a first phase and a second phase. The first phase may be referred to as a dummy phase and the second phase may be referred to as a real phase. The dummy phase may be associated with performing the instruction an additional time to check against the result of the execution of the instruction associated with the real phase. As illustrated, the instruction 112 may be fetched from the instruction memory 102 and duplicated or split into a dummy instruction 116 and a real instruction 114. Each of the dummy instruction 116 and the real instruction 114 are executed by the core 100 at different time periods. The core 100 may execute the dummy instruction 116 to generate a dummy result 122 during a first time period 120. At a second time period 130 the core 100 may store the dummy result 122 in a dummy buffer 150 and also execute the real instruction 114 to generate a real result 132. Comparison circuitry 140 may compare the dummy result 122 in the dummy buffer 150 with the real result 132 and, if they match, the real result 132 may be provided to an output buffer 160. The output buffer 160 may be used for writing data to a data memory 104.

While the dummy buffer 150 and the output buffer 160 are illustrated as in the comparison circuitry, it will be appreciated that the dummy buffer 150 and the output buffer 160 may be located elsewhere or may be omitted in various embodiments.

Various embodiments, by checking or comparing the result of the dummy phase with the result of the real phase, determine or identify if an error occurred during execution of an instruction as reflected in different results of the instruction executions of the dummy instruction 116 and the real instruction 114. In contrast, if the results are the same then no error has occurred.

Alternatively, various embodiments may have the dummy phase with the execution of the dummy instruction 116 performed first and before execution of the real phase with the real instruction 114. For example, the core 100 may perform the computation or operation to execute the real instruction 114 of the real phase and send the results to a buffer, register, or memory. The core 100 may the perform the computation or operation of executing the dummy instruction 116 of the dummy phase and send the results to a check operation or comparison operation of comparison circuitry 140. The check operation or comparison operation may receive and/or hold the results of each of the real phase and the dummy phase so that these results may be checked or compared against each other to determine or identify an error. If there is a determination of no error then the main core may output the result of the real phase.

In various embodiments, when dummy results 122 and the real results 132 match (i.e., no error), then the core 100 may change a state or status to commit the real result 132 (e.g., to a buffer 160) and, subsequently, transmit the real result 132 as an output. This output may be, for example, transmitted to a register or memory to be stored, such as a data memory 104.

FIG. 2 illustrates an exemplary sequence diagram of a time repetition operations in accordance with one or more embodiments of the present disclosure. The sequence diagram illustrates how operations executing the dummy phase occur before the real phase. In various embodiments, execution of instructions may take 1 clock cycle (e.g., CLK #). When the clock cycle of the execution of the dummy instruction is next to the clock cycle of the execution of the real instruction then those clock cycles are adjacent, which is illustrated in FIG. 2. In various embodiments such clock cycles of execution of the dummy instructions and associated real instruction are adjacent. Alternatively and/or additionally, the clock cycles of execution of a dummy instruction and an associated real instruction may not be adjacent.

In various embodiments, a core 100 may fetch or receive multiple instructions execute, compute, or perform (e.g., 202, 204, 206, 208, etc.). In various embodiments, example instructions include but are not limited to load (LD) instructions and/or addition (ADD) instructions. The instructions may be duplicated or split into the dummy phase and real phase (e.g., 202D, 202R, 204D, 204R, 206D, 206R, 208D, 208R, etc.).

In the sequence diagram, the core 100 alternates or interleaves executing instructions such that a dummy instruction is executed and then a real instruction is executed. Thus dummy instruction 202D is executed in a first time period 210A at a first clock cycle CLK1 before an associated real instruction 202R that is executed in a second time period 210B at a second clock cycle CLK2.

While performing in a lockstep mode the core 100 continues to execute instructions to alternate between executing dummy instructions and real instructions. Dummy instruction 204D is executed in a third time period 210C at a third clock cycle CLK3 before an associated real instruction 204R that is executed in a fourth time period 210D at a fourth clock cycle CLK4. Dummy instruction 206D is executed in a fifth time period 210E at a fifth clock cycle CLK5 before an associated real instruction 206R that is executed in a sixth time period 210F at a sixth clock cycle CLK6. Dummy instruction 208D is executed in a seventh time period 210G at a seventh clock cycle CLK7 before an associated real instruction 208R that is executed in an eighth time period 210H at an eighth clock cycle CLK8.

Thus the core 100 may execute dummy instruction(s) and real instruction(s) so that a dummy result(s) of dummy instructions may be compared with the real result to identify if a fault has occurred.

In various embodiments there may be more than one dummy buffer as may need as many buffers as the clock distance for the respective interleaved execution operations.

It will be readily appreciated that various embodiments may include execution of one or more instructions taking more than one clock cycle and, thus, the alternating between time periods (e.g., 210N) may be with time periods being two or more clock cycles.

In various embodiments, the interleaving is not clock cycle or time based but it may be instruction based. Thus the interleaving may be associated with interleaving one or more instructions to be computed or executed. For example, a load operation may require loading data from a memory and the memory may be slow to reply, so the load instruction may take more than one clock cycle to finish.

FIG. 3 illustrates an exemplary block diagram of a single core in accordance with one or more embodiments of the present disclosure. A processor core 300 or core 300 may be configured to communicate to receive and/or transmit data to an instruction memory 102, such as via an instruction memory interface 302, and to communicate receive and/or transmit data to a data memory 104, such as via a data memory interface 304.

The core 300 may be a 2 stage pipeline core. For example, the core 300 may include a first stage of an instruction fetch stage with instruction fetch (IF) circuitry 310 and a second stage of an instruction decode and execute stage with instruction decode and execute (ID) circuitry 320. While it will be appreciated that the present disclosure refers to a 2 stage pipeline core, such as those offered by Ibex core, it will also be appreciated that the present disclosure provides numerous improvements described over these available 2 stage pipeline cores.

The IF circuit 310 may fetch instruction from the instruction memory 102 via the instruction memory interface 302. The instruction fetch circuitry 310, having fetched instructions, may provide the instructions to ID circuitry 320.

The ID circuitry 320 may include a controller 322 and/or control status registers (CSR) 324. The ID circuitry 320 may decode the instructions received from the IF circuit 310 and then execute the instructions. Results of the executed instructions may be committed to one or more locations, such as a CSR 324, register file 330, LSU 340, or data memory 104 via data memory interface 304, etc.

The controller 322, such as with a finite state machine, controls how the core 300 proceeds to a next state to perform a subsequent operations and/or execute a subsequent instruction.

The controller 322 may control the core 300 to proceed to a next state to perform a subsequent operation, such as a jump operation, branch operation, etc.

In various embodiments, control logic for implementing the IF stage in the IF circuitr310 and the ID stage in the ID circuitry 320 may be controlled with, for example, a finite state machine in the controller 322.

For example, proceeding to the next state may have the core 300 alternating or cycling between execution of dummy instructions and real instructions. As a further example, the IF circuit 310 may be controlled to fetch a dummy instruction at a first clock cycle. At a second clock cycle the IF circuit 310 may pass the dummy instruction to the ID circuitry 320 and fetch a real instruction and the ID circuitry 320 may be controlled to execute the dummy instruction. In a third clock cycle, the IF circuit 310 may be controlled to pass the real instruction to the ID circuitry 320 and the ID circuitry 320 may be controlled to pass the dummy result to a dummy register or dummy buffer and to execute the real instruction to generate a real result. The core 300 may then control the real result with the dummy result to identify if an error occurred.

FIG. 4 illustrates an exemplary diagram of a time repetition control logic in accordance with one or more embodiments of the present disclosure. The controller 322 may contain a finite state machine that may control one or more operations of the core 300 for, among other things, fetching and executing instructions. The finite state machine may include a number of finite states, and by progressing from a current state to a next state the finite state machine may implement control logic for temporal lockstep operations. The finite state machine to implement control logic for issuing and comparing dummy computations and real computations. The control logic is associated with instruction fetch (IF) and instruction decode and execute (ID) operations. When operating, the IF stage and ID stages of the 2 stage pipeline core may alternate between dummy instructions and real instructions. Additionally, in various embodiments flush operation may occur if an error is detected.

In various embodiments, the finite state machine of the controller 322 may include, for example, four states. A first state 410 may be an IDLE state. A second state 420 may be an IF DUMMY, ID INVALID state. A third state 430 may be an IF COMMIT, ID DUMMY state. A fourth state may be an IF DUMMY, ID COMMIT state. Additionally and/or alternatively, the FSM may include one or more additional states. The transition between states may be based on one or more control signals received by the finite state machine of the controller 322.

The first state 410 may be an IDLE state. In this first state 410 of an IDLE state the finite machine for controlling temporal lockstep operations may be idling or waiting for one or more control signals to progress to the next state. In various embodiments, the controller 322 may be configured to include a lockstep mode that uses the finite statement machine 400 and a non-lockstep mode in which one or more operations described herein are not used (e.g., only real instructions are processed). The controller 322 may wait for, among other things, a temporal lockstep enable signal (e.g., en_temporal_lockstep) to control the finite state machine 400 to proceed to a next state. In various embodiments, the finite state machine 400 may also wait for an ID stage ready signal (e.g., id_in_ready_i) to also control proceeding to a next state.

In operation, for example, the first state 410 of an IDLE state may proceed to the second state 420 of IF DUMMY/ID INVALID when the finite state machine 400 receives signal(s) 412, which may include an enable temporal lockstep signal (e.g., en_temporal_lockstep) and ID ready signal (e.g., id_in_ready_i). In such an example when both of these control signals 412 are received (or the negatives are not received) then the finite state machine may transition from the first state 410 to the second state 420.

The second state 420 may be an IF DUMMY, ID INVALID state. In the second state 420 the finite state machine may control the IF stage to fetch an instruction associated with a dummy instruction for the dummy phase and control the ID stage to not perform any operations (e.g., not decode and execute an instruction). In various embodiments, the control of the ID stage to not take any action may be referred to as INVALID, which may represent no state or instruction received by the ID circuit 320 and that the ID circuit 320 is ready to proceed to a state (e.g., the third state 430).

In operation, for example, the second state 420 may transition to the third state 430 when the finite state machine 400 receives signal(s) 422, which may include an ID ready signal (e.g., id_in_ready_i). When this signal indicates that the ID stage is ready to decode an execute an instruction that may have been fetched, the fetched instruction may be passed to the ID stage for decoding and execution in the third state 430.

The third state 430 may be an IF COMMIT/ID DUMMY state. In the third state 430 the finite state machine 400 may control the IF stage to fetch an instruction associated with a real instruction for the real phase and control the ID stage to decode and execute the dummy instruction previously fetched and provided to the ID stage.

The transition from the third state to another state may be based one or more control signals. The finite state machine 400 may transition from the third state 430 to the fourth state 440 based on control signal(s) 432, from the third state 430 to the second state 420 based on control signal(s) 434, and from the third state 430 to the first state 410 based on control signal(s) 436.

For example, the third state 430 may transition to the fourth state 440 when the finite state machine 400 receives control signal(s) 432, which may include an instruction executing signal (e.g., instr_executing_i), an instruction done signal (e.g., instr_done_i), and a no flush signal (e.g., !flush_id). The instruction executing signal may be a control signal associated with an instruction which starts or continues (for multicycle instructions) to be executed. The instruction done signal may be a control signal associated with the final execution clock cycle of an instruction. The no flush signal may be a signal associated with no errors and, thus, no control signal to flush the pipeline.

For example, the third state 430 may transition to the second state 420 when the finite state machine 400 receives control signal(s) 434, which may include a flush signal (e.g., flush_id_i) and an enable temporal lockstep signal (e.g., en_temporal_lockstep). The flush signal may be a control signal associated with an error and, thus, a control signal to flush the pipeline.

For example, the third state 430 may transition to the first state 410 when the finite state machine 400 receives control signal(s) 436, which may include a flush signal (e.g., flush_id_i) and a not enable temporal lockstep signal (e.g., !en_temporal_lockstep). The not enable temporal lockstep signal may be a control signal associated with not operating the finite state machine 400 of the controller 322 in a temporal lockstep mode. This may be associated with operating the controller 322 in another mode, such as a normal mode where only real instructions are, among other things, fetched and processed.

The fourth state 440 may be an IF DUMMY/ID COMMIT state. In the fourth state 440 the finite state machine 400 may control the IF stage to fetch an instruction associated with a dummy instruction for the dummy phase and control the ID stage to decode and execute the real instruction previously fetched and provided to the ID stage.

The transition from the third state to another state may be based one or more control signals. The finite state machine 400 may transition from the fourth state 440 to the third state 430 based on control signal(s) 442, from the fourth state 440 to the second state 420 based on control signal(s) 444, and from the fourth state 440 to the first state 410 based on control signal(s) 446.

For example, the fourth state 440 may transition to the third state 430 when the finite state machine 400 receives control signal(s) 442, which may include an instruction executing signal (e.g., instr_executing_i), an instruction done signal (e.g., instr_done_i), and a no flush signal (e.g., !flush_id).

For example, the fourth state 440 may transition to the second state 420 when the finite state machine 400 receives control signal(s) 444, which may include a flush signal (e.g., flush_id_i) and an enable temporal lockstep signal (e.g., en_temporal_lockstep). The flush signal may be a control signal associated with an error and, thus, a control signal to flush the pipeline.

For example, the fourth state 440 may transition to the first state 410 when the finite state machine 400 receives control signal(s) 446, which may include a flush signal (e.g., flush_id_i) and a not enable temporal lockstep signal (e.g., !en_temporal_lockstep).

In operation of a temporal lockstep mode, the finite state machine 400 may transition between the third state 430 and the fourth state 440 and back again iteratively to fetch and execute dummy instructions and real instructions so that the respective results of these instructions may be compared to determine or identify errors.

In various embodiments the finite state machine 400 may include more or less states, such as having states associated with one or more other stages of a pipeline.

FIG. 5 illustrates an exemplary diagram of an instruction duplication logic in accordance with one or more embodiments of the present disclosure.

Various embodiments may include voter circuitry for instructions for advancing from a current state to a next state be checked for errors. For example, a finite state machine 510 may provide at a current state and provide a control signal for proceeding to the next state. The control signal may be passed to a plurality of FIFOs 532 (e.g., 532A, 532B, and 532C) and a plurality of combinational logic circuits 542 (e.g., 542A, 542B, and 542C). The outputs of the plurality of FIFOs 532 and the outputs of the plurality of combinational logic circuits 542 may be provided to voter circuitry 520. The voter circuitry 520 may provide outputs based on a majority of inputs voting for the correct input. These outputs may be provided to, for example, an instruction memory interface 502, IF/ID registers 506, or finite state machine 510.

This may be beneficial for if a later stage (e.g., ID stage) may be blocked by, for example, a memory access, such as if there is a so memory access. Then the FIFO 532 may continue to fetch and store instructions until this blockage is resolved. In various embodiments, the use of FIFOs provide for and anticipates that there are no jumps and no need to flush the system while performing linear code accessing and processing. The use of the FIFOs 532 and combinational logic circuits 542 may allow for recoverability and error coverage because it may identify an error and, in some embodiments, restart from where the error is identified.

Each of the FIFOs 532 may buffer and/or realign compressed or uncompressed instructions. In various embodiments, each of the FIFOs 532 may be checked for fault by the voter circuitry 520. For example, when three FIFOs 532A, 532B, and 532C each provide an output to the voter circuitry 520, the voter circuitry 520 is used to determine if at least two (i.e., a majority) have the same instructions or outputs to determine that such instruction is without fault. Similarly, combination logic circuits 542 may be used with the voter circuitry 520 to determine that an output of the combinational logic circuits 542 are without an error or a fault.

Thus the voter circuitry 520 protects against an error in fetching an instruction. For example, if an instruction fetched is provided to the first FIFO 532A, the second FIFO 532B, and the third FIFO 532C, any error in the instruction at the output of one of these FIFOs would not be passed on the voter circuitry 520. This provides fault coverage detection.

The voter circuitry 520 may be used with the fetching of instructions, such as before IF circuit 310. In the instruction fetch stage, the IF circuit 310 is responsible for fetching instructions and preparing the fetched instructions for further stages (e.g., ID stage).

When ready to fetch instruction, the IF circuit 310 may fetch as many instructions as possible and fill each FIFO 532 with these instructions as they are fetched. For example, each FIFO 532 may store 2, 3, or more instructions.

The finite state machine 510 may include a plurality of states that may be progressed through. These may be queue management states, issued address states, and next address states. For example, outstanding queue management states may include states of valid_req, discard_req, rdata_oustanding, branch_discard, and rdata_pmp_err. The issued address state may include stored_addr. The next address state may include fetch_addr.

Valid_req may be when received a valid instruction, which may be fed into FIFOs 532 to indicate that the FIFOs 532 are okay to proceed.

Discard_req may be a request has been made to the instruction memory but the instruction memory has not replied yet. The finite state machine 510 may decide to jump or transition (e.g., branch, jump, interruption) to another state and/or instruction, including discarding the current instruction. The finite state machine 510 may ask for the current instruction again in another, subsequent instruction for the current instruction request having an issue.

Rdata_outstanding may be when have already issued a request and are waiting to receive data in response. For example, there may be a clock cycle where the request was made and then a subsequent clock cycle(s) (e.g., 3 or 4 clock cycles later receive the instruction requested). In the subsequent clock cycle the finite state machine 510 may issue another data request even though the first data request may be outstanding and waiting for a response.

Branch_discard may be related to certain embodiments implementing a branch prediction structure. A branch may be a loop or the like where there is an iterative or repetitive task, operation, or instruction. The branch discard may discard such operation(s). Iterative operations may have predicted or speculated next operations, which may be disregarded with branch discard.

Rdata_pmp_err may be associated with physical memory protection. This may be associated with privileged accessing of memory, such as for reading and writing as opposed to just reading. If were to try and override the program then this error may prevent from doing so.

Stored_addr may be associated with an address of an internal register that is used to hold a valid memory address until a request is acknowledged by the memory. It may be used to keep track of what is being requested of the associated memory.

Fetch_addr may be associated with an address of an internal register and used to hold a valid memory address until a request is acknowledged by the memory. It may be used to identify the next address to fetch instructions from.

FIG. 6 illustrates an exemplary diagram of a data path protection logic for a pipeline in accordance with one or more embodiments of the present disclosure. Various embodiments may include a pipeline checker circuit 600 that may include an IF/ID buffer 610 and a comparator 620. The pipeline checker circuit 600 may compare data from the IF circuit 310 that is passed to the ID circuit 320, which passes through the IF/ID buffer 610. The comparator 620 compares the data entering the IF/ID buffer 610 and the data leaving the IF/ID buffer 610 to see if there is a mismatch, which indicates an error. For example, a dummy instruction and a real instruction during two time periods may be compared to determine if there is mismatch.

Thus data produced by the IF stage is sampled and protected with the IF/ID buffer 610 and comparator 620, which may be referred to as a pipeline checker. If there is a mismatch, the comparator 620 may generate a pipeline mismatch signal (e.g., pipe_reg_mismatch).

In various embodiments, the IF/ID buffer circuit 60 stores the processed data in the IF/ID buffer 610 in a first clock cycle, such as for a dummy instruction. In the second clock cycle the previous stage is supposed to compute the same instruction for a real instruction. This is directly compared against the saved one.

In various embodiments with a pipeline with more than two stages there may be more of these pipeline buffers and comparators for data path protection.

In various embodiments, when switching to a new clock cycle with a new instruction that is a new dummy instruction (e.g., every other clock cycle) then would not perform this check with the comparator or may ignore or disregard a mismatch signal in such clock cycles.

FIG. 7 illustrates an exemplary diagram of a data path protection logic for a register file in accordance with one or more embodiments of the present disclosure. The register file 330 is where operands may be loaded and results may be stored internally for a core 300. For example, in various embodiments the internal memory of the register file 330 may be 32×32 bit registers that are used to store temporary results on. A result of an operation of executing an instruction may be stored in the register file 330. The register file 330 may be where one or more data are written to, and the data path protection logic be a register file checker circuit 700.

The register file checker circuit temporary hold data for a dummy phase in a dummy register during a first clock cycle and then, in a second clock cycle, compares data for a real phase against the dummy data in the dummy register. If the data is the same a write enable signal is provided to the register file 330 and the real data is written to the register file 330. Alternatively, if there is a mismatch in the dummy data and the real data, a mismatch generates an error.

A write data signal 748 (e.g., wdata) is the result of an instruction and write address signal 746 (e.g., waddr) is an address in the register file 330 of where to write the data of the write data signal 748 (e.g., wdata).

In various embodiments, instead of writing directly to the register file, a write enable signal 766 (e.g., we) is provided after the data path protection logic generates this write enable signal 766 (e.g., we).

The register file checker circuit may include, among other things, AND gates 712, multiplexer 720, and registers 710, 730.

A dummy register 710 may store the temporary results of the dummy phase to be used for checking.

For example, in a first clock cycle a dummy instruction may be executed by the ID stage of the core 300 to generate dummy results. The dummy results may be provided by the ID stage to the register file 300 with the write data signal 748 (e.g., wdata) and the write address signal 746 (e.g., waddr). During the dummy phase, the write enable signal 766 (e.g., we) signal may not permit writing and, thus, the register file will not write during the dummy phase. The dummy results may also be provided to an operator 730A that provides that then provides the dummy results to a multiplexer 720 and an operator 730B. The multiplexer may be controlled to pass the dummy results to the dummy register 710 based on a select signal to the multiplexer 720 that selects an input that is the dummy results or a current output of the dummy register 710.

The select signal for the multiplexer 720 may be generated from an AND gate 712A based on an input of an ID check register enable signal 752 (e.g., id_check_reg_en) and a write enable read-access-write (RAW) signal 744 (e.g., we_raw). The ID check register enable signal 752 (e.g., id_check_reg_en) may be controlled by the controller 322 to control the cycle(s) for when to check the dummy results and the real results. The write enable read-access-write (RAW) signal 744 (e.g., we_raw) may provide a signal to be used in generating a write enable signal 766 (e.g., we) signal to enable writing to the register file 330.

The logic of generating a write enable signal 766 (e.g., we) may be referred to as masking. To generate the write enable signal 766 (e.g., we) two AND gates 712C and 712D may be used. The first AND gate 712C may have inputs of write enable read-access-write (RAW) signal 744 (e.g., we_raw) and a commit instruction signal 742 (e.g., commit_instr). When both signal are high or the same, the first AND gate 712C has a high (e.g., 1) output that is used along with the inverse or NOT of an register file mismatch signal 764 (e.g., rf_mismatch) as inputs to a second AND gate 712D to generate the write enable signal 766 (e.g., we).

The register file mismatch signal 764 (e.g., rf_mismatch) is generated by the register file checker circuit 700 by comparing the current (e.g., real) data of the write data signal 748 (e.g., wdata) signal and write data address signal 746 (e.g., waddr) to the previously stored data of the write data signal 748 (e.g., wdata) and write data address signal (e.g., waddr) in the dummy register 710. The operator 730B is controlled with the output of AND gate 712B that has inputs of the write enable read-access-write (RAW) signal 744 (e.g., we_raw) and an ID check compare enable signal 754 (e.g., id_check_comp_en). The ID check compare enable signal 754 (e.g., id_check_comp_en) is generated by the controller 322 to signal when the operator 730B is do perform a comparison. The operator 730B compares for when the current data of the write data signal 748 (e.g., wdata) and address of the write data address signal (e.g., waddr) to the previously stored data of the write data signal 748 (e.g., wdata) and address of the write data address signal 746 (e.g., waddr) in the dummy register 710 are the same and provides an inverse or NOT signal to generate the register file mismatch signal 764 (e.g., rf_mismatch). When there is a difference and the operator 730B is enabled to operate, the register file mismatch signal 764 (e.g., rf_mismatch) is generated, such as by generating a high state or a 1. The register file mismatch signal 764 (e.g., rf_mismatch) signal may also provide to the controller 322 for use in, for example, performing recovery logic and/or going into safe state.

Thus the register file checker circuit 700 operates over multiple clock cycles to compare real results of a real phase against the dummy results of dummy phase data to identify if there is a mismatch or error. A mismatch or error disables the writing to the register file so that incorrect results are not saved to the register file 330.

FIG. 8 illustrates an exemplary diagram of data path protection logic for a CSR in accordance with one or more embodiments of the present disclosure. The CSR 324 is a control and status register that may be associated with a CSR checker circuit 800. A CSR may have data written to it when a commit instruction is executed. Additionally, CSR 324 may have privileges on access, so there may be an access signal required to write to the CSR 324.

To write data to the CSR an operate enable signal 866 (e.g., op_en) and access signal 868 (e.g., access) may be used to allow for data to be written at an address of the CSR 324.

The CSR checker circuit 800 may include a plurality of AND gates 822, multiplexers 832, operators 810, 814, and dummy register 812.

The CSR checker circuit, similar to the register filer checker circuit, temporarily holds data for a dummy phase in a dummy register during a first clock cycle and then, in a second clock cycle, compares data for a real phase against the dummy data in the dummy register. If the data is the same a write enable signal and an access signal is provided to the CSR 324 and the real data is written to the CSR 324. Alternatively, if there is a mismatch in the dummy data and the real data, a mismatch generates an error.

At a first time period a write data signal 850 (e.g., wdata) and a write data address signal 848 (e.g., waddr) may be generated for a dummy phase. The write data signal (e.g., wdata) signal 850 and the write data address signal 848 (e.g., waddr) may be provided to an operator 814A.

The write data signal 850 (e.g., wdata) is the result of an instruction and write data address signal 848 (e.g., waddr) is an address in the CSR 324 of where to write the data of the write data signal 850 (e.g., wdata).

In various embodiments, instead of writing directly to the CSR 324, an operate enable signal 866 (e.g., op_en) and an access signal 868 (e.g., access) are provided after the CSR checker circuit 800 provides these signals.

A dummy register 812 may store the temporary results of the dummy phase to be used for checking.

For example, in a first clock cycle a dummy instruction may be executed by the ID stage of the core 300 to generate dummy results. The dummy results may be provided by the ID stage to the CSR 324 with the write data signal 850 (e.g., wdata) and the write address signal 848 (e.g., waddr). During the dummy phase, the operate enable signal 866 (e.g., op_en) and access signal 868 (e.g., access) may not permit writing to the CSR 324 and, thus, the CSR 324 will not write during the dummy phase. The dummy results may also be provided to an operator 814A that provides that then provides the dummy results to a multiplexer 832B and an operator 814B. The multiplexer 832B may be controlled to pass the dummy results to the dummy register 812 based on a select signal to the multiplexer 832B that selects an input that is the dummy results or a current output of the dummy register 812.

The select signal for the multiplexer 832B may be generated from an AND gate 822C based on an input of an ID check register enable signal 852 (e.g., id_check_reg_en) and an output of AND gate 822B. The AND gate 822B may generate an output signal based on inputs of an operate enable read-access-write signal 842 and a CSR write operate signal 844 (e.g., csr_write_op). The operate enable raw signal 842 (e.g., op_en_raw) may be controlled by the controller 322 to control when to enable read and write operations of the CSR 324. The CSR write operate signal 844 (e.g., csr_write_op) may be controlled by the controller 322 to control when to write an operation to the CSR 324.

The logic of generating an operate enable signal 866 (e.g., op_en) may be referred to as a first masking involving AND gate 822A, multiplexer 832A, and AND gate 822D. The first AND gate 822A may have inputs of an operate enable raw signal 842 (e.g., op_en_raw) and the inverse or NOT of the CSR write operate signal 844 (e.g., csr_write_op). The output of the AND gate 822A may serve as an input into multiplexer 832A and another input to the multiplexer 832A may be the operate enable raw signal 842 (e.g., op_en_raw). The multiplexer 832A may choose an input to pass as its output based on a select signal of a commit instruction signal 856 (e.g., commit_instr), which may be generated by the controller 322. The output of the multiplexer 832A may be provided to the AND gate 822D that also has an input of an inverse or NOT of a CSR mismatch signal 864 (e.g., csr_mismatch). The AND gate 822D may generate an operate enable signal 866 (e.g., op_en) that allows for writing to the CSR 324 when there is not a mismatch between result of a previously executed dummy phase instruction and a result of the current real phase instruction.

A masking operator 810 may be similar to the masking to generate the operate enable signal 866 (e.g., op_en), including use of AND gates and a multiplexer. Thus the masking operator 810 may provide an access signal 868 (e.g., access) when there is not a between result of a previously executed dummy phase instruction and a result of the current real phase instruction.

The CSR mismatch signal 864 (e.g., csr_mismatch) may be generated by the CSR checker circuit 800 by comparing the current (e.g., real) write data signal 850 (e.g., wdata) signal and write data address signal 848 (e.g., waddr) to the previously stored write data signal 850 (e.g., wdata) and write data address signal 848 in the dummy register 812. The operator 814B is controlled with the output of AND gate 822E that has inputs of the output of the AND gate 822B and an ID check compare enable signal 854 (e.g., id_check_comp_en). The ID check compare enable signal 854

(e.g., id_check_comp_en) is generated by the controller 322 to signal when the operator 814B is to perform a comparison. The operator 814B compares for when the current write data signal 850 (e.g., wdata) and write data address signal 848 (e.g., waddr) to the previously stored write data signal 850 (e.g., wdata) and write data address signal 848 (e.g., waddr) in the dummy register 812 are the same and provides an inverse or NOT signal to generate the CSR mismatch signal 864 (e.g., csr_mismatch). When there is a difference and the operator 814B is enabled to operate, the CSR mismatch signal 864 (e.g., csr_mismatch) is generated, such as by generating a high state or a 1. The CSR mismatch signal 864 (e.g., csr_mismatch) signal may also provide to the controller 322 for use in, for example, performing recovery logic and/or going into safe state.

Thus the CSR checker circuit 800 operates over multiple clock cycles to compare real results of a real phase against the dummy results of dummy phase data to identify if there is a mismatch or error. A mismatch or error disables the writing to the CSR 324 so that incorrect results are not saved to the CSR 324.

FIG. 9 illustrates an exemplary diagram of data path protection logic for an LSU in accordance with one or more embodiments of the present disclosure. The LSU 340 is load-store unit that may be associated with an LSU checker circuit 900. The LSU 340 may be used by the core 300 to store what the core 300 sends to store in memory. Thus the LSU may be a connection from the core 300 to the memory, or to the memory interface. In various embodiments, more than one location in memory may be affected by a single instruction, such as when data may be split across more than one line in memory, which may be associated with two write requests. Thus various embodiment may use an LSU checker circuit 900 with more than one dummy register 910 (e.g., 910A, 910B). The multiple dummy registers 900 may be used for identifying and/or handling mismatches that may be associated with misaligned accesses in memory. The LSU may also require pipeline access, and the dummy registers 910 may be used to check if transition in the finite state machine 322 is correct. When there are no mismatches or errors, the finite state machine 322 may control transitions between two or more states, including states associated with storing data to outside memory as well, when there is an error, addressing flushing the pipeline. Additionally, the finite state machine 322 may include a request signal 952A (e.g., req) making a request of memory and wait for a reply signal 952B from the memory, which may be after one or more clock cycles.

In various embodiments, the FSM 322 may communicate with the core 300 to provide a dummy store operate signal 962 (e.g., dummy_store_op_o) and receive a commit instruction signal 964 (e.g., commit_instr).

The FSM may also communicate with an LSU 340 such as via an LSU data interface, to receive from the LSU a request signal 954 and a write enable signal 956.

The LSU 340 may also provide one or more signals 958, including a data signal, an address signal, and/or a byte enable signal. The one or more signal 958 may be stored in the operator 940. The one or more signals 958 are first for a dummy phase and then for a real phase at a subsequent time period that will be compared to the one or more signals 958 for the dummy phase.

Two or more dummy registers 910 may be used, such as a first dummy register 910A and a second dummy register 910B.

The first dummy register 910A may receive an input from the output of a first multiplexer 920A. The first multiplexer 920A may use a select signal from an AND gate 914A to select from between a first input of the one or more signals 958 provided by the operator 940 or from what is currently stored in the first dummy register 910A. The AND gate 914 may generate a select signal based on inputs of an ID check register enable signal 972 (e.g., id_check_reg_en) and a first lsu register enable signal 944A (e.g., lsu_reg_en[0]) from the FSM 322.

The second dummy register 910B may receive an input from the output of a second multiplexer 920B. The second multiplexer 920B may use a select signal from an AND gate 914B to select from between a first input of the one or more signals 958 provided by the operator 940 or from what is currently stored in the second dummy register 910B. The AND gate 914B may generate a select signal based on inputs of an ID check register enable signal 972 (e.g., id_check_reg_en) signal and a second lsu register enable signal 944B (e.g., lsu_reg_en[1]) from the FSM 322.

After the dummy registers 910A, 910B store dummy results, at a subsequent time period the stored dummy results are compared to real results provided with the one or more signals 958.

The dummy results of the first dummy register 910A may be provided to an operator 930A that also receives the real results of the one or more signals 958 from the operator 940. The operator 930A compares the dummy results and the real results based on an input from an AND gate 912A to indicate to perform the comparison. The AND gate 912A has inputs of a first lsu register enable signal 976A (e.g., lsu_reg_en[0]) and an ID check compare enable signal 974 (e.g., id_check_comp_en). If a mismatch is determined then the operator 930A generates a first LSU mismatch signal 942A (e.g., lsu_mismatch[0]) that is provided to the FSM 322.

The dummy results of the second dummy register 910B may be provided to an operator 930B that also receives the real results of the one or more signals 958 from the operator 940. The operator 930B compares the dummy results and the real results based on an input from an AND gate 912B to indicate to perform the comparison. The AND gate 912B has inputs of a second lsu register enable signal 976B (e.g., lsu_reg_en[1]) and an ID check compare enable signal 974 (e.g., id_check_comp_en). If a mismatch is determined then the operator 930B generates a second LSU mismatch signal 942B (e.g., lsu_mismatch[1]) that is provided to the FSM 322.

FIG. 10 illustrates an exemplary diagram of control check logic in accordance with one or more embodiments of the present disclosure. Various embodiments may include control checker circuits that include a voter circuitry 1020. The control logic may be checked against errors to prevent wrong choices about the next state, which may include disrupting the dummy/commit sequence. A voting circuit 1020 passes the majority result of the inputs it receives.

For example, a control checker circuit 1000 may include a current state register 1010, a plurality of combinational circuits 1030 (e.g., 1030A, 1030B, and 1030C), and voter circuitry 1020. The combinational circuits 1030 may each receive inputs of inputs signals 1002 and a current state signal from the current state register 1010. The combinational circuit 1030B may each provide their outputs to the voter circuitry 1020 that will generate as an output based on the majority of input signals received by the voter circuitry 1020. Thus if one output of the combinational circuits 1030 (e.g., 1030A) mismatched with the outputs of the other combinational circuits 1030 (e.g., 1030B and 1030C), the voter circuitry 1020 will pass along what is provided by a majority of the combinational circuits 1030C.

In various embodiments, the combinational logic circuit 1030 may be used to determine a next state based on the inputs received by the combinational logic circuit 1030. Thus the output of the voter circuitry will be a next state signal 1022 that will be provided to a current state register 1010 to be stored as the then current state. The voter circuitry 1020 may also provide the next state as an output signal 1040, which may be provided to other locations in a core 300. This may allow for determining that the logic performing state transitions is correct without saving the state in the register file 330 or data memory 104.

FIGS. 11A and 11B illustrate exemplary diagrams of voting circuits in accordance with one or more embodiments of the present disclosure. Each of the voting circuits of FIG. 11A and FIG. 11B pass along as an output the majority result from the inputs.

FIG. 11A illustrates a first voter circuit 1100A that includes receiving three input signals—a first input signal 1102A, a second input signal 1102B, and a third input signal 1102C. The first input signal 1102A and the second input signal 1102B are provided as inputs to a first AND gate 1110A. The first input signal 1102A and the third input signal 1102C are provided as inputs to a second AND gate 1110B. The second input signal 1102B and the third input signal 1102C are provided as inputs to a third AND gate 1110C. The outputs of the first AND gate 1110A, the second AND gate 1110B, and third AND gate 1110C are provided to an OR gate 1120, which generates an output signal 1130. The first voter circuit 1100A may be referred to as an SOP voter circuit.

FIG. 11B illustrates a second voter circuit 1100B that includes receiving three input signals—a first input signal 1132A, a second input signal 1132B, and a third input signal 1132C. The first input signal 1132A and the second input signal 1132B are provided as inputs to a XOR gate 1140. The output of the XOR gate 1140 is provided as a select signal to a multiplexer 1150. The second input signal 1132B and the third input signal 1132C are provided as inputs to the multiplexer 1150 to select from to generate as an output 1160. The second voter circuit 1100B may be referred to as a Ban's voter circuit.

FIG. 12 illustrates an exemplary diagram of recovery logic in accordance with one or more embodiments of the present disclosure. The recovery logic may be included in a present recovery circuit 1200. The recovery circuit may quickly check if there is an error and provide an output of a recovery signal for the resent cycle. This may allow for the controller 322 to cancel or abort a state and/or restart from a current instruction. Performing a recovery operation may include flushing the pipeline and the program counter (PC) may resume where the error has been detected. By tracking which instruction execution was faulty the controller 322 may perform the instruction execution again as a recovery operation. For example, if an error was associated with fetching an instruction, then the instruction should be fetched again to address the error. If the error was associated with decoding and executing an instruction then the instruction should be decoded and executed again to address the error.

The illustrated controller 322, which may include a temporal lockstep controller that is associated with the recovery logic, including issuing a flushing signal. Thus the temporal lockstep controller may be a part of the finite state machine described herein. This may include adding one or more states that may be used for the recovery logic based on one or more error signals. For example, such additional state(s) may receive an error signal and cause a flush signal to be generated to flush the pipeline. Alternatively, in various embodiments, the temporal lockstep controller may be separate from controller 322.

The recovery circuit may include a plurality of OR gates 1222, a plurality of AND gates 1224, a plurality of registers 1212, 1214 and 1216, and a plurality of multiplexers 1232. The recovery circuit may also include the controller 322. The recovery circuit 1200 may check for errors associated with the ID stage and also errors associated with the IF stage of the pipeline.

In various embodiments checking for errors associated with the ID stage, a first OR gate 1222A may receive a plurality of inputs signals, such as a register file error signal 1242 (e.g., rf_err), a CSR error signal 1244 (e.g., csr_err), a LSU error signal 1246 (e.g., lsu_err), and/or a target error signal 1248 (e.g., target_err). The register file error signal 1242 (e.g., rf_err) may be or may be associated with the register file mismatch signal 764 (e.g., rf_mismatch). The CSR error signal 1244 (e.g., csr_err) may be or may be associated with the CSR mismatch signal 864 (e.g., csr_mismatch). The LSU error signal 1246 (e.g., lsu_err) may be or may be associated with the first LSU mismatch signal 942A (e.g., lsu_mismatch[0]) or the second LSU mismatch signal 942B (e.g., lsu_mismatch[1]). If any of these error signals are positive (e.g., a 1) to indicate an error, then the first OR gate 1222A may pass a positive output as an input into a second OR gate.

The second OR gate 1222B may receive a first input from the output of the first OR gate 1222A and an output of an ID error register 1214. The ID error register 1214 may store if there is or is not currently an error associated with the ID stage. The output of the OR gate 1222B may provide an output to a first AND gate 1224A.

The first AND gate 1224A may receive inputs from the output of the second OR gate 1222B and an inverse or NOT of a clear error signal 1262 (e.g., clear_err) that may be generated by the controller 322. The output of the first AND gate 1224A is an ID stage error signal 1262 (e.g., id_err) that may be provided to the ID error register 1214 as well as to a first multiplexer 1232A, a fourth OR gate 1222D, and the controller 322.

In various embodiments checking for errors associated with the IF stage, a third OR gate 1222C may receive a first input from an output of an IF error register 1212 and a second input of a pipeline error signal 1252 (e.g., pipe_reg_mismatch). The IF error register 1212 may store if there is or is not currently an error associated with the IF stage. The output of the third OR gate 1222C may provide an output to a second AND gate 1224B.

The second AND gate 1224B may receive inputs from the output of the third OR gate 1222C and an inverse or NOT of a clear error signal 1262 (e.g., clear_err) that may be generated by the controller 322. The output of the second AND gate 1224B is an IF stage error signal 1264 (e.g., if_err) that may be provided to the IF error register 1212 as well as to a fourth OR gate 1222D.

The fourth OR gate 1222D may receive inputs from the output of the first AND gate 1224A and the output of the second AND gate 1224B. The output of the fourth OR gate 1222D provides an error signal 1268 (e.g., err) that is output to a third AND gate 1224C that indicates when there is an error with either the ID stage or the IF stage and there is not clear error signal.

The third AND gate 1224C receives inputs of the error signal 1268 (e.g., err) from the fourth OR gate 1222D and an inverse or NOT of the clear error signal 1262 (e.g., clear_err) from the controller 322. The third AND gate 1224C generates an output of a save recovery program counter signal 1270 (e.g., [save_rec_pc) that is provided as a select signal the second multiplexer 1232B.

The first multiplexer 1232A may select between two input signals received by using a first select signal. The two input signals may be a program counter IF stage signal 1254 (e.g., pc_if) and a program counter ID stage signal 1256 (e.g., pc_id). The first select signal may be the ID stage error signal 1262 (e.g., id_err). The output of the first multiplexer 1232A may be provided as a second input to the second multiplexer 1232B.

The second multiplexer 1232B may select between two input signals received by using a second select signal. The two input signals may be an output of the recovery program counter register 1216 and the output of the first multiplexer 1232A. The second select signal may be the save recovery program counter signal 1270 (e.g., [save_rec_pc) output by the third AND gate 1224C. The output of the second multiplexer 1232B may be provided as an input to recovery program counter register 1216. The output of the recovery program counter register 1216 may be a recovery program counter signal 1280 (e.g., rec_pc), which may be provided to the core 300.

FIG. 13 illustrates an exemplary block diagram of a device in accordance with one or more embodiments of the present disclosure. For example, the device 1300 may be a device in a functional safety technical field, such as automotive, aerospace, and consumer electronics or the like. The device 1300 illustrated may be a system and/or apparatus that includes a processor 1302, memory 1304, communications circuitry 1306, and/or input/output circuitry 1308, all of which may be connected by a bus or buses 1310. While such connections are illustrated as bus 1310, it will be readily appreciated that there may be multiple other connections.

The processor 1302 may be a single processor core (e.g., 100, 300) or, although illustrated as a single block, may be comprised of a plurality of components and/or processor circuitry. In various embodiments, the processor 1302 may be comprised of multiple processor cores and operations described herein may be performed by a single processor core.

In various embodiments, the processor 1302 may be configured to execute applications, instructions, and/or programs stored in the processor 1302, memory 1304, or otherwise accessible to the processor 1302. When executed by the processor 1302, these applications, instructions, and/or programs may enable the execution of one or a plurality of the operations and/or functions described herein. Regardless of whether it is configured by hardware, firmware/software methods, or a combination thereof, the processor 1302 may comprise entities capable of executing operations and/or functions according to the embodiments of the present disclosure when correspondingly configured.

The memory 1304 may comprise, for example, a volatile memory, a non-volatile memory, or a certain combination thereof. Although illustrated as a single block, the memory 1304 may comprise a plurality of memory components. In various embodiments, the memory 1304 may comprise, for example, a random access memory, a cache memory, a flash memory, a hard disk, a circuit configured to store information, or a combination thereof. The memory 1304 may be configured to write or store data, information, application programs, instructions, etc. so that the processor 1304 may execute various operations and/or functions according to the embodiments of the present disclosure. For example, in at least some embodiments, a memory 1304 may be configured to buffer or cache data for processing by the processor 1302. Additionally or alternatively, in at least some embodiments, the memory 1304 may be configured to store program instructions for execution by the processor 1302. The memory 1304 may store information in the form of static and/or dynamic information. When the operations and/or functions are executed, the stored information may be stored and/or used by the processor 1302.

The memory may include, among other things, instruction memory 102 and/or a data memory 104.

The communication circuitry 1306 may be implemented as a circuit, hardware, computer program product, or a combination thereof, which is configured to receive and/or transmit data from/to another component or apparatus. The computer program product may comprise computer-readable program instructions stored on a computer-readable medium (e.g., memory 1304) and executed by a processor 1302. In various embodiments, the communication circuitry 1306 (as with other components discussed herein) may be at least partially implemented as part of the processor 1302 or otherwise controlled by the processor 1302. The communication circuitry 1306 may communicate with the processor 1302, for example, through a bus 1310. Such a bus 1310 may connect to the processor 1302, and it may also connect to one or more other components of the processor 1302. The communication circuitry 1306 may be comprised of, for example, transmitters, receivers, transceivers, network interface cards and/or supporting hardware and/or firmware/software, and may be used for establishing communication with another component(s), apparatus(es), and/or system(s). The communication circuitry 1306 may be configured to receive and/or transmit data that may be stored by, for example, the memory 1304 by using one or more protocols that can be used for communication between components, apparatuses, and/or systems.

The input/output circuitry 1308 may communicate with the processor 1302 to receive instructions input by an operator and/or to provide audible, visual, mechanical, or other outputs to an operator. The input/output circuitry 1308 may comprise supporting devices, such as a keyboard, a mouse, a user interface, a display, a touch screen display, lights (e.g., warning lights), indicators, speakers, and/or other input/output mechanisms. The input/output circuitry 1308 may comprise one or more interfaces to which supporting devices may be connected. In various embodiments, aspects of the input/output circuitry 1308 may be implemented on a device used by the operator to communicate with the processor 1302. The input/output circuitry 1308 may communicate with the memory 1304, the communication circuitry 1306, and/or any other component, for example, through a bus 1310.

It should be readily appreciated that the embodiments of the apparatuses, systems, and methods described herein may be configured in various additional and alternative manners in addition to those expressly described herein.

CONCLUSION

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. An apparatus comprising:
a processor core comprising a pipeline including an instruction fetch circuit and an instruction decode and execute circuit;
wherein the instruction decode and execute circuit comprises a controller including a finite state machine, wherein the finite state machine comprises a plurality of states to control the processor core;
a voting circuit configured to provide a control signal to control the finite state machine for transitioning from a current state of the plurality of states to a next state;
wherein the processor core, based at least on the plurality of states of the finite state machine, is configured to:
fetch a first instruction;
generate a first dummy instruction based on the first instruction and a first real instruction based on the first instruction;
execute the first dummy instruction to generate a first dummy result;
store the first dummy result in a first dummy buffer;
execute the first real instruction to generate a first real result; and
compare the first dummy result stored in the first dummy buffer with the first real result to identify an error.

2. The apparatus of claim 1, wherein the voting circuit comprises a plurality of combinational logic circuits and a plurality of FIFO circuits, wherein each of the plurality of FIFO circuits is uniquely associated with one of the plurality of combinational logic circuits, and wherein the voting circuit is electrically connected to receive inputs from the plurality of FIFO circuits and the plurality of combinational logic circuits and determine an output based at least on a majority of common inputs from the plurality of FIFO circuits and the plurality of combinational logic circuits having a plurality of same outputs.

3. The apparatus of claim 1, wherein the pipeline further includes a pipeline checker circuit between the instruction fetch circuit and the instruction decode and execute circuit, wherein the pipeline checker circuit is configured to identify a pipeline error associated with one or more instructions provided from the instruction fetch circuit to the instruction decode and execute circuit.

4. The apparatus of claim 1, further comprising a recovery circuit configured to, on identifying an error, trigger one or more recovery operations to repeat execution of one or more operations by the processor core.

5. The apparatus of claim 1, wherein the processor core is further configured to:
execute the first dummy instruction to generate a first dummy value at a first clock cycle; and
execute the first real instruction to generate a first real value at a second clock cycle.

6. The apparatus of claim 5, wherein the second clock cycle is adjacent to the first clock cycle.

7. The apparatus of claim 5, wherein the second clock cycle is not adjacent to the first clock cycle.

8. A system comprising:
an instruction memory;
a processor core comprising a pipeline including an instruction fetch circuit and an instruction decode and execute circuit;
wherein the instruction decode and execute circuit comprises a controller including a finite state machine, wherein the finite state machine comprises a plurality of states to control the processor core;
a voting circuit configured to provide a control signal to control the finite state machine for transitioning from a current state of the plurality of states to a next state;
wherein the processor core, based at least on the plurality of states of the finite state machine, is configured to:

fetch a first instruction from the instruction memory;

generate a first dummy instruction based on the first instruction and a first real instruction based on the first instruction;

execute the first dummy instruction to generate a first dummy result;

store the first dummy result in a first dummy buffer;

execute the first real instruction to generate a first real result; and compare the first dummy result stored in the first dummy buffer with the first real result to identify an error.

9. The system of claim 8, wherein the voting circuit comprises a plurality of combinational logic circuits and a plurality of FIFO circuits, wherein each of the plurality of FIFO circuits is uniquely associated with one of the plurality of combinational logic circuits, and wherein the voting circuit is electrically connected to receive inputs from the plurality of FIFO circuits and the plurality of combinational logic circuits and determine an output based at least on a majority of common inputs from the plurality of FIFO circuits and the plurality of combinational logic circuits having a plurality of the same outputs.

10. The system of claim 8, wherein the pipeline further includes a pipeline checker circuit between the instruction fetch circuit and the instruction decode and execute circuit, wherein the pipeline checker circuit is configured to identify a pipeline error associated with one or more instructions provided from the instruction fetch circuit to the instruction decode and execute circuit.

11. The system of claim 8, wherein the system includes a register file checker circuit configured to identify an error associated with a register file of the processor core.

12. The system of claim 8, wherein the processor core is further configured to:

execute the first dummy instruction to generate a first dummy value at a first clock cycle; and execute the first real instruction to generate a first real value at a second clock cycle.

13. The system of claim 12, wherein the second clock cycle is adjacent to the first clock cycle.

14. The system of claim 12, wherein the second clock cycle is not adjacent to the first clock cycle.

15. A method comprising:

providing a processor core comprising a pipeline including an instruction fetch circuit and an instruction decode and execute circuit;

wherein the instruction decode and execute circuit comprises a controller including a finite state machine, wherein the finite state machine comprises a plurality of states to control the processor core;

providing a voting circuit configured to provide a control signal to control the finite state machine for transitioning from a current state of the plurality of states to a next state;

fetching, with the instruction fetch circuit, a first instruction;

generating a first dummy instruction based on the first instruction and a first real instruction based on the first instruction;

executing, with the instruction decode and execute circuit, a first dummy instruction to generate a first dummy result;

store the first dummy result in a first dummy buffer;

executing, with the instruction decode and execute circuit, the first real instruction to generate a first real result; and comparing the first dummy result stored in the first dummy buffer with the first real result to identify an error.

16. The method of claim 15, wherein the voting circuit comprises a plurality of combinational logic circuits and a plurality of FIFO circuits, wherein each of the plurality of FIFO circuits is uniquely associated with one of the plurality of combinational logic circuits, and wherein the voting circuit is electrically connected to receive inputs from the plurality of FIFO circuits and the plurality of combinational logic circuits and determine an output based at least on a majority of common inputs from the plurality of FIFO circuits and the plurality of combinational logic circuits having a plurality of same outputs.

17. The method of claim 15, wherein the pipeline further includes a pipeline checker circuit between the instruction fetch circuit and the instruction decode and execute circuit, wherein the pipeline checker circuit is configured to identify a pipeline error associated with one or more instructions provided from the instruction fetch circuit to the instruction decode and execute circuit.

18. The method of claim 15 further comprising:

executing the first dummy instruction to generate a first dummy value at a first clock cycle; and executing the first real instruction to generate a first real value at a second clock cycle.

19. The method of claim 18, wherein the second clock cycle is adjacent to the first clock cycle.

20. The method of claim 18, wherein the second clock cycle is not adjacent to the first clock cycle.

* * * * *